(12) United States Patent
Komatsu et al.

(10) Patent No.: US 8,650,868 B2
(45) Date of Patent: Feb. 18, 2014

(54) CONTROL APPARATUS, CONTROL METHOD, AND CONTROL PROGRAM FOR ELASTIC ACTUATOR DRIVE MECHANISM

(75) Inventors: Mayumi Komatsu, Kyoto (JP); Yasunao Okazaki, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/613,221

(22) Filed: Sep. 13, 2012

(65) Prior Publication Data

US 2013/0000480 A1  Jan. 3, 2013

Related U.S. Application Data

(63) Continuation of application No. PCT/JP2011/006818, filed on Dec. 6, 2011.

(30) Foreign Application Priority Data

Dec. 17, 2010 (JP) .................................. 2010-281167

(51) Int. Cl.
*B25J 19/06* (2006.01)
(52) U.S. Cl.
USPC .................. 60/327; 60/403; 92/92; 91/363 A; 91/511
(58) Field of Classification Search
USPC ............ 92/92; 60/403; 91/358 R, 511, 363 A
See application file for complete search history.

(56) References Cited

U.S. PATENT DOCUMENTS

| 8,253,367 B2 | 8/2012 | Komatsu et al. |
| 8,359,849 B2 * | 1/2013 | Yuan ................................ 60/328 |
| 2006/0207419 A1 * | 9/2006 | Okazaki et al. .................. 91/35 |
| 2011/0078508 A1 | 3/2011 | Komatsu et al. |

FOREIGN PATENT DOCUMENTS

| JP | 61-107405 | 5/1986 |
| JP | 62-212710 | 9/1987 |
| JP | 2-204805 | 8/1990 |
| JP | 3-36782 | 4/1991 |
| JP | 5-55279 | 8/1993 |
| JP | 8-1819 | 1/1996 |
| JP | 11-247807 | 9/1999 |
| JP | 2008-121783 | 5/2008 |
| JP | 2010-58261 | 3/2010 |
| JP | 4563512 | 8/2010 |
| WO | 2011/086638 | 7/2011 |

OTHER PUBLICATIONS

English translation of International Preliminary Report on Patentability issued Jul. 4, 2013 in International (PCT) Application No. PCT/JP2011/006818.
International Search Report issued Feb. 21, 2012 in International (PCT) Application No. PCT/JP2011/006818.

\* cited by examiner

*Primary Examiner* — Edward Look
*Assistant Examiner* — Logan Kraft
(74) *Attorney, Agent, or Firm* — Wenderoth, Lind & Ponack, L.L.P.

(57) ABSTRACT

There is provided an abnormality determination unit that determines whether or not an output measurement unit is abnormal, in order to determine abnormality of the output measurement unit. When the output measurement unit is abnormal, the operation of an elastic actuator is controlled not in accordance with a measurement result of the output measurement unit but in accordance with an internal state model.

8 Claims, 12 Drawing Sheets

CONTROL APPARATUS, CONTROL METHOD, AND CONTROL PROGRAM FOR ELASTIC ACTUATOR DRIVE MECHANISM

CROSS-REFERENCE TO RELATED APPLICATIONS

This is a continuation application of International Application No. PCT/JP2011/006818, filed Dec. 6, 2011, which claims priority of Japanese Patent Application No.: 2010-281167 filed on Dec. 17, 2010, the content of which is incorporated herein by reference.

TECHNICAL FIELD

The technical field relates to a control apparatus, a control method, and a control program for an elastic actuator drive mechanism, used for controlling operations of the drive mechanism that is driven by an elastic actuator such as a fluid pressure drive actuator, which is driven due to deformation of an elastic body.

BACKGROUND ART

In recent years, active development of robots cooperating with workers has been observed because of increase in cell production plants and the like. Unlike those conventional robots operating in areas separated from workers' areas, these robots cooperating with workers need to share the work areas with the workers. Accordingly, specifications required to these cooperative robots are different from the conventional industrial robots and the like.

Firstly, a conventional industrial robot includes an electric motor or a decelerator, and achieves high accuracy in positioning a hand such as repeatability of about 0.1 mm by feedback control with high gain. However, a mechanism driven by such an electric motor is highly rigid with poor flexibility in many cases, which is problematic in terms of safety.

To the contrary, safety is quite important to a robot cooperating with a worker so as not to hurt the worker by contact with each other. Therefore, such a mechanism driven by the electric motor as in the conventional industrial robot is unsuited to domestic robots and the like in the fields in which safety is highly required, and there is a need for flexible and safe robot arms.

In order to solve the problems, there has been proposed a robot arm that includes a pneumatic actuator of Mckibben type, for example. The pneumatic actuator of Mckibben type is configured such that a restraint part made of fiber cords is provided on an outer surface of a tubular elastic body made of a rubber material, and respective ends of the tubular elastic body are hermetically sealed by sealing members. When an internal pressure is applied to an inner space of the tubular elastic body with use of a compressive fluid such as air through a fluid injection/ejection part, the tubular elastic body tends to expand mainly in a radial direction. However, the restraint part functions to convert the radially expanding motion to a motion along a center axis of the tubular elastic body. As a result, the tubular elastic body is contracted in the entire length. This Mckibben type actuator is mainly configured by an elastic body, and is thus characterized by being flexible, safe, and light in weight.

Secondly, the conventional industrial robot operates in the area separated from the workers' area. Accordingly, safety is considered to be most preferably achieved by immediately stopping the robot in case of malfunction of a sensor or the like.

To the contrary, with a robot operating in the workers' area, it is not always safest to immediately stop the robot in case of malfunction of a sensor or the like. For example, even when the robot cooperating with a worker suddenly stops, the cooperative worker may be unable to immediately stop and thus may be in danger. However, when the sensor is in trouble, it is impossible to obtain information necessary for operation control. Therefore, it is difficult to operate the robot continuously.

In order to cope with such malfunction of a sensor, there has been disclosed, as a conventional technique, a control apparatus that controls a robot by reading data preliminarily instructed and stored, instead of a sensor signal (Patent Literature 1). There has been also disclosed a shift control apparatus for use in a robot including a distance sensor and a plurality of shift mechanism position detectors, the shift control apparatus including a computing unit that obtains an alternative signal same as a correct shift mechanism position signal to be originally transmitted from a broken shift mechanism position detector, from a sensor signal from the distance sensor and a shift mechanism position signal from the normal shift mechanism position detector (Patent Literature 2).

CITATION LIST

Patent Literature

Patent Literature 1: Japanese Examined Utility Model Publication No. H08-1819
Patent Literature 2: Japanese Examined Patent Publication No. H05-55279

SUMMARY OF THE INVENTION

The technique disclosed in Patent Literature 1 preliminarily requires the instructed data to be used in place of a sensor signal. However, it is difficult to estimate in advance every operations of a robot and is therefore hard to prepare such instructed data. Further, the technique disclosed in Patent Literature 2 has a problem that a correct alternative signal cannot be computed for a robot provided with no distance sensor.

One non-limiting and exemplary embodiment provides a control apparatus, a control method, and a control program for an elastic actuator drive mechanism, each of which achieves continuous operations of a drive mechanism of a robot arm or the like driven by an elastic actuator, without immediately stopping the robot arm even in cases of malfunction of a sensor, with no need for preliminary preparation of instructed data or provision of a sensor enabling computation of an alternative signal.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a control apparatus of an elastic actuator drive mechanism, comprising:

an abnormality determination unit that determines whether or not an output measurement unit that measures an output of an elastic actuator is abnormal;

a normal case operation control unit that controls the elastic actuator drive mechanism in accordance with an output of the output measurement unit when the abnormality determination unit determines that the output measurement unit is normal;

an abnormal case operation control unit that controls the elastic actuator drive mechanism in accordance with an internal state model when the abnormality determination unit determines that the output measurement unit is abnormal; and a control unit that operates the normal case operation control unit when the abnormality determination unit determines that the output measurement unit is normal, and that switches from the normal case operation control unit to the abnormal case operation control unit so as to operate the abnormal case operation control unit when the abnormality determination unit determines that the output measurement unit is abnormal; wherein the normal case operation control unit comprises:

a first desired output unit that outputs a desired value of the output of the elastic actuator; and a torque control unit that calculates a desired joint torque in accordance with an output of the first desired output unit and the output of the output measurement unit, the normal case operation control unit controls the elastic actuator drive mechanism in accordance with the desired joint torque calculated by the torque control unit, the abnormal case operation control unit comprises:

a second desired output unit that outputs a desired value of the output of the elastic actuator; and a desired internal state information acquisition unit that acquires desired internal state information on the elastic actuator in accordance with a desired value of the output of the second desired output unit and the internal state model, and the abnormal case operation control unit controls the elastic actuator drive mechanism not in accordance with a measurement result of the output of the elastic actuator but in accordance with the desired internal state information acquired by the desired internal state information acquisition unit so that the elastic actuator is operated continuously.

These general and specific aspects may be implemented using a system, a method, and a computer program, and any combination of systems, methods, and computer programs.

A control apparatus of an elastic actuator drive mechanism according to the one general aspect includes the control unit, the normal case operation control unit, and the abnormal case operation control unit. Further, the normal case operation control unit is provided with the abnormality determination unit that determines whether or not an output measurement unit is in trouble. In this configuration, when the abnormality determination unit determines that the output measurement unit is not normal, the operation can be switched, by the control unit, from the normal case operation control unit to the abnormal case operation control unit. As a result, the abnormal case operation control unit controls the elastic actuator drive mechanism not in accordance with a measurement result of an output of the elastic actuator but in accordance with the internal state model, so that the elastic actuator is operated continuously. Therefore, even in a case where the output measurement unit is in trouble, the elastic actuator drive mechanism is controlled not to be stopped immediately but to be operable continuously and safely.

Further, a control method and a control program for an elastic actuator drive mechanism according to the another general aspect includes the abnormality determination operation of determining whether or not the output measurement unit is in trouble. In this configuration, when the abnormality determination unit determines that the output measurement unit is not normal, the operation can be switched, by the control unit, from the normal case operation control unit to the abnormal case operation control unit. As a result, the abnormal case operation control unit controls the elastic actuator drive mechanism not in accordance with a measurement result of an output of the elastic actuator but in accordance with the internal state model, so that the elastic actuator is operated continuously. Therefore, even in a case where the output measurement unit is in trouble, the elastic actuator drive mechanism is controlled not to be stopped immediately but to be operable continuously and safely.

BRIEF DESCRIPTION OF DRAWINGS

These and other aspects and features of the present invention will become clear from the following description taken in conjunction with the embodiments thereof with reference to the accompanying drawings, in which.

DETAILED DESCRIPTION

Figure 1:
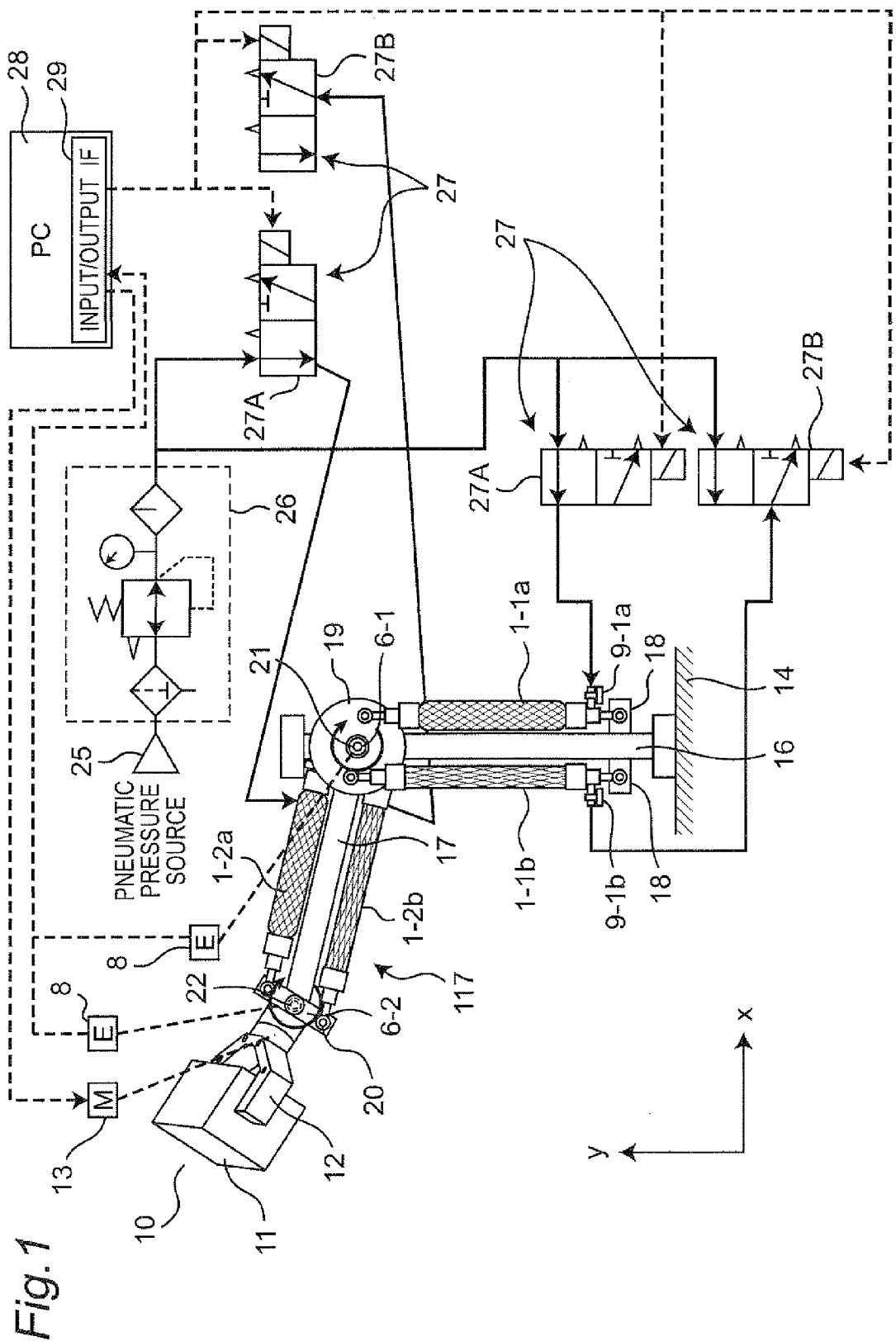
FIG. 1 is a view showing a configuration of an elastic actuator drive mechanism according to a first embodiment of the present invention.

Described in detail below are embodiments of the present invention with reference to the accompanying drawings.

Before detailing the embodiments of the present invention with reference to the drawings, reference is made to various aspects of the present invention.

According to a first aspect of the present invention, there is provided a control apparatus of an elastic actuator drive mechanism, comprising:

an abnormality determination unit that determines whether or not an output measurement unit that measures an output of an elastic actuator is abnormal;

a normal case operation control unit that controls the elastic actuator drive mechanism in accordance with an output of the output measurement unit when the abnormality determination unit determines that the output measurement unit is normal;

an abnormal case operation control unit that controls the elastic actuator drive mechanism in accordance with an internal state model when the abnormality determination unit determines that the output measurement unit is abnormal; and a control unit that operates the normal case operation control unit when the abnormality determination unit determines that the output measurement unit is normal, and that switches from the normal case operation control unit to the abnormal case operation control unit so as to operate the abnormal case operation control unit when the abnormality determination unit determines that the output measurement unit is abnormal; wherein the normal case operation control unit comprises:

a first desired output unit that outputs a desired value of the output of the elastic actuator; and a torque control unit that calculates a desired joint torque in accordance with an output of the first desired output unit and the output of the output measurement unit, the normal case operation control unit controls the elastic actuator drive mechanism in accordance with the desired joint torque calculated by the torque control unit, the abnormal case operation control unit comprises:

a second desired output unit that outputs a desired value of the output of the elastic actuator; and a desired internal state information acquisition unit that acquires desired internal state information on the elastic actuator in accordance with a desired value of the output of the second desired output unit and the internal state model, and the abnormal case operation control unit controls the elastic actuator drive mechanism not in accordance with a measurement result of the output of the elastic actuator but in accordance with the desired internal state information acquired by the desired internal state information acquisition unit so that the elastic actuator is operated continuously.

According to a second aspect of the present invention, there is provided the control apparatus according to the first aspect, wherein the desired internal state information acquisition unit of the abnormal case operation control unit comprises a first desired internal state calculation unit that calculates desired internal state information in accordance with the desired value of the output of the second desired output unit and the internal state model, and the elastic actuator drive mechanism is controlled in accordance with the desired internal state information calculated by the first desired internal state calculation unit so that the elastic actuator is operated continuously.

According to a third aspect of the present invention, there is provided the control apparatus according to the first aspect, wherein the desired internal state information acquisition unit of the abnormal case operation control unit comprises:

an output estimation unit that estimates the output of the elastic actuator in accordance with the internal state model and the internal state information on the elastic actuator; and a second desired internal state information calculation unit that calculates desired internal state information in accordance with the output of the elastic actuator estimated by the output estimation unit and the desired value of the output of the second desired output unit; and the elastic actuator drive mechanism is controlled in accordance with the desired internal state information calculated in accordance with the output of the elastic actuator estimated by the output estimation unit, so that the elastic actuator is operated continuously.

According to a fourth aspect of the present invention, there is provided the control apparatus according to the first aspect, wherein the abnormality determination unit compares information on a relationship between the output of the output measurement unit and an internal state from an internal state measurement unit that measures an internal state of the elastic actuator, with information on a relationship between the output of the elastic actuator and the internal state of the elastic actuator in an internal state model for the output measurement unit being normal, to determine whether or not the output measurement unit is abnormal.

According to a fifth aspect of the present invention, there is provided the control apparatus of an elastic actuator drive mechanism according to any one of the first to fourth aspects, wherein the second desired output unit in the abnormal case operation control unit and the first desired output unit in the normal case operation control unit output desired values of different outputs of the elastic actuator, respectively, to control by the abnormal case operation control unit, when the abnormal case operation control unit is operated, such that the elastic actuator moves to a safety position and then stops.

According to a sixth aspect of the present invention, there is provided the control apparatus of an elastic actuator drive mechanism according to any one of the first to fourth aspects, wherein the elastic actuator is a fluid pressure actuator.

According to a seventh aspect of the present invention, there is provided a method of controlling an elastic actuator drive mechanism, the method comprising:

determining, by an abnormality determination unit, whether or not an output measurement unit that measures an output of an elastic actuator is abnormal;

controlling, by a normal case operation control unit, the elastic actuator drive mechanism in accordance with an output of the output measurement unit, when the abnormality determination unit determines that the output measurement unit is normal, or controlling, by an abnormal case operation control unit, the elastic actuator drive mechanism in accordance with an internal state model, when the abnormality determination unit determines that the output measurement unit is abnormal;

operating, by a control unit, the normal case operation control unit when the abnormality determination unit determines that the output measurement unit is normal, or switching from the normal case operation control unit to the abnormal case operation control unit to operate the abnormal case operation control unit by the control unit, when the abnormality determination unit determines that the output measurement unit is abnormal;

when the normal case operation control unit is operated, outputting, from a first desired output unit, a desired value of the output of the elastic actuator, and calculating, by a torque control unit, a desired joint torque in accordance with an output of the first desired output unit and the output of the output measurement unit, to control the elastic actuator drive mechanism in accordance with the desired joint torque calculated by the torque control unit; and when the abnormal case operation control unit is operated, outputting, from a second desired output unit, a desired value of the output of the elastic actuator, and acquiring, by a desired internal state information acquisition unit, desired internal state information on the elastic actuator in accordance with the desired value of the output of the second desired output unit and the internal state model, to control the elastic actuator drive mechanism not in accordance with a measurement result of the output of the elastic actuator but in accordance with the desired internal state information acquired by the desired internal state information acquisition unit so that the elastic actuator is operated continuously.

According to an eighth aspect of the present invention, there is provided a control program for an elastic actuator drive mechanism, the program causing a computer to execute functions of:

determining, by an abnormality determination unit, whether or not an output measurement unit that measures an output of an elastic actuator is abnormal;

controlling, by a normal case operation control unit, the elastic actuator drive mechanism in accordance with an output of the output measurement unit, when the abnormality determination unit determines that the output measurement unit is normal;

controlling, by an abnormal case operation control unit, the elastic actuator drive mechanism in accordance with an internal state model, when the abnormality determination unit determines that the output measurement unit is abnormal;

operating, by a control unit, the normal case operation control unit when the abnormality determination unit determines that the output measurement unit is normal, or switching from the normal case operation control unit to the abnormal case operation control unit to operate the abnormal case operation control unit by the control unit, when the abnormality determination unit determines that the output measurement unit is abnormal;

when the normal case operation control unit is operated, outputting, from a first desired output unit, a desired value of the output of the elastic actuator, and calculating, by a torque control unit, a desired joint torque in accordance with an output of the first desired output unit and the output of the output measurement unit, to control the elastic actuator drive mechanism in accordance with the desired joint torque calculated by the torque control unit; and when the abnormal case operation control unit is operated, outputting, from a second desired output unit, a desired value of the output of the elastic actuator, and acquiring, by a desired internal state information acquisition unit, desired internal state information on the elastic actuator in accordance with the desired value of the output of the second desired output unit and the internal state model, to control the elastic actuator drive mechanism not in accordance with a measurement result of the output of the elastic actuator but in accordance with the desired internal state information acquired by the desired internal state information acquisition unit so that the elastic actuator is operated continuously.

Described below are the embodiments of the present invention with reference to the accompanying drawings.

(First Embodiment)

Description is made to an example of a specific configuration of a control apparatus 30 of an elastic actuator drive mechanism 10 according to the first embodiment.

FIG. 1 is a view showing a configuration of the elastic actuator drive mechanism 10 according to the first embodiment of the present invention. The elastic actuator drive mechanism 10 is configured as a robot arm of two degrees of freedom, including a first joint shaft 6-1 and a second joint shaft 6-2. The first joint shaft 6-1 rotates positively and negatively within an xy plane inclusive of an x axis and a y axis provided perpendicularly to each other. The second joint shaft 6-2 also rotates positively and negatively within the xy plane. FIG. 1 illustrates elastic expansion/contraction structures 1-1a, 1-1b, 1-2a, and 1-2b, which are provided separately from one another as examples of elastic actuators or fluid pressure actuators. The elastic expansion/contraction structures will be denoted by reference sign 1 if indicated representatively. The first joint shaft 6-1 and the second joint shaft 6-2 serve as rotary shafts of a first joint and a second joint, respectively, of the elastic actuator drive mechanism (an elastic expansion/contraction structure drive mechanism in the present embodiment) 10.

Figure 2:
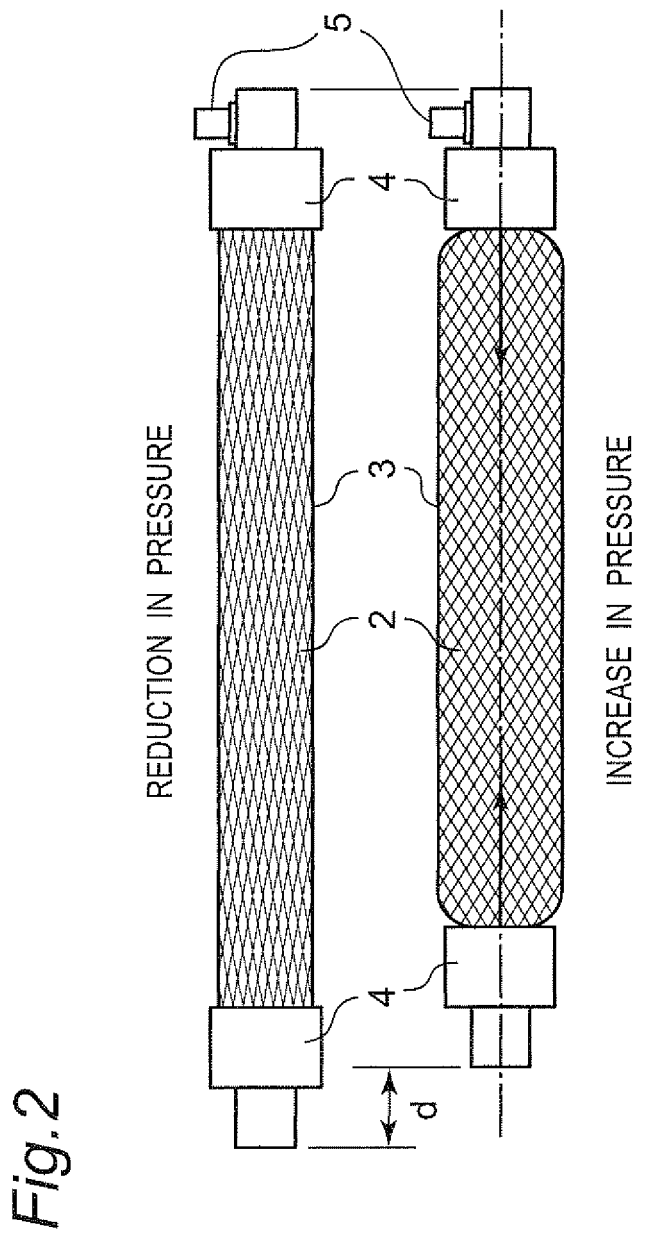
FIG. 2 is a view showing a configuration and operations of each of elastic expansion/contraction structures serving as examples of elastic actuators according to the first embodiment.

As shown in FIG. 2, each of the elastic expansion/contraction structures 1 includes a hollow tubular elastic body 2 and a deformation direction regulation member 3. The tubular elastic body 2 is made of a rubber material and serves as a driving unit. The deformation direction regulation member 3 is made of resin or metal fiber cords, which are less likely to stretch and is woven into a mesh shape. The deformation direction regulation member 3 is provided on an outer surface of the tubular elastic body 2. The deformation direction regulation member 3 is configured such that deformation in the radial direction due to expansion of the tubular elastic body 2 is converted to contraction in length in the axial direction perpendicular to the radial direction, while deformation in the radial direction due to contraction of the tubular elastic body 2 is converted to expansion in length in the axial direction. The tubular elastic body 2 has two ends that are hermetically sealed by sealing members 4, respectively. The sealing member 4 at one of the ends of the elastic expansion/contraction structure 1 is provided with a tubular fluid passage member 5. The fluid passage member 5 is provided therein with a flow passage through which a compressive fluid passes, so that the fluid can be injected into and ejected from the hollow inner space of the hollow tubular elastic body 2 through the fluid passage member 5. The compressive fluid such as air is supplied into the hollow tubular elastic body 2 by way of the fluid passage member 5. Alternatively, the fluid passage member 5 may be provided at each of the sealing members 4 at the respective ends of the elastic expansion/contraction structure 1.

When an internal pressure is applied to the inner space of the tubular elastic body 2 by the compressive fluid thus supplied, the tubular elastic body 2 tends to expand mainly in the radial direction. However, the deformation direction regulation member 3 functions to convert the expansion in the radial direction to the motion along the center axis of the tubular elastic body 2, and thus the tubular elastic body 2 is contracted in the entire length. In this manner, the elastic expansion/contraction structure can be applicable as an elastic actuator that is driven linearly.

Referring again to FIG. 1, the elastic actuator drive mechanism 10 includes the pair of elastic expansion/contraction structures 1 that are provided to face each other and are supported at the joint shaft 6-1 or 6-2 serving as a support point. One of the paired elastic expansion/contraction structures 1 is contracted, while another one of which is expanded. A force is applied by way of the support point (the joint shaft 6-1 or 6-2) so that the joint shaft 6-1 or 6-2 is axially rotated to be driven antagonistically. Accordingly, positive rotation and negative rotation can be enabled at the joint shaft 6-1 or 6-2. More specifically, the elastic expansion/contraction structures 1-1a and 1-1b are driven antagonistically to rotate the first joint shaft 6-1 positively and negatively. Further, the elastic expansion/contraction structures 1-2a and 1-2b are driven antagonistically to rotate the second joint shaft 6-2 positively and negatively.

There is provided a support member 16 in a bar shape. The support member 16 has a lower end fixed to a fixing surface 14, and an upper end to which a support body 19 in a circular disc shape, for example, is supported to be rotatable coaxially with the first joint shaft 6-1. There is further provided a support body 18 that is fixed to the lower end fixed to the fixing surface 14, of the support member 16. The support body 18 has a bar shape and extends perpendicularly to the longitudinal direction of the support member 16. The ends of the elastic expansion/contraction structures 1-1a and 1-1b are rotatably coupled to the support body 19 and the support body 18, respectively. When the elastic expansion/contraction structures 1-1a and 1-1b are driven antagonistically, the support body 19 is rotated positively and negatively about a support shaft 21 of the first joint shaft 6-1 within the xy plane. As a result, in the elastic actuator drive mechanism 10, a front arm support member 17, which is coupled to the support body 19 (illustrated as a quadrilateral plate member in FIG. 3), can be rotated positively and negatively.

The support member 17 for a front arm 117 has a proximal end fixed to the support body 19 (illustrated in FIG. 3), so as to be rotatable integrally with the support body 19.

The support member 17 has a distal end coupled with a center of a support body 20, which has a bar shape and is fixed so as to extend perpendicularly to the longitudinal direction of the support member 17, so that the support body 20 is rotatable about the axis of the second joint shaft 6-2. Between the support body 19 connected with one of the ends of the support member 17 and the support body 20 coupled with the distal end of the support member 17, the elastic expansion/contraction structures 1-2a and 1-2b are provided and the ends thereof are rotatably coupled to the support bodies, respectively. The elastic expansion/contraction structures 1-2a and 1-2b are driven antagonistically to rotate the support body 20 positively and negatively within the xy plane about a support shaft 22 of the second joint shaft 6-2. As a result, a hand 12 for gripping an object, which is coupled to the support body 20, can be relatively rotated positively and negatively.

A motor 13 for opening/closing the hand 12 is attached to the hand 12. When the motor 13 is operated, the hand 12 is closed to grip an object 11 to be conveyed. The position and the posture of the hand 12 are described as the position and the posture of an arm tip (hand).

Pressure sensors 9-1a and 9-1b are provided as examples of internal state measurement units that measure the internal states (internal pressures as one example thereof) of the elastic expansion/contraction structures 1-1a and 1-1b, respectively. The pressure sensors 9-1a and 9-1b are provided to the fluid passage members 5 (fluid injection/ejection ports) of the elastic expansion/contraction structures 1-1a and 1-1b, and measure the pressures in the elastic expansion/contraction structures 1-1a and 1-1b, respectively. Similarly, the elastic expansion/contraction structures 1-2a and 1-2b are provided with pressure sensors 9-2a and 9-2b as examples of internal state measurement units, respectively.

As to be described later, there are provided three-port flow rate proportional solenoid valves 27 (27A and 27B), which are connected to the elastic expansion/contraction structures 1-1a and 1-1b and the elastic expansion/contraction structures 1-2a and 1-2b, respectively. All the flow rate proportional solenoid valves 27 are connected to a control computer 28 that is configured by an ordinary personal computer and an input/output IF 29. The control computer 28 independently controls contracting and expanding motions of the elastic expansion/contraction structures 1-1a and 1-1b and the elastic expansion/contraction structures 1-2a and 1-2b, through the flow rate proportional solenoid valves 27. The joint shafts 6-1 and 6-2 are provided respectively with displacement measurement units (encoders 8 provided as one example thereof in the first embodiment) as output measurement units, for example. The encoders 8 can measure joint angles of the joint shafts 6-1 and 6-2, respectively. The elastic expansion/contraction structures 1 are provided with pressure measurement units (the pressure sensors 9 (9-1a, 9-1b, 9-2a, and 9-2b) provided as examples thereof in the first embodiment) as one example of the internal state measurement units so that the pressure sensors 9 can measure the internal pressures of the elastic expansion/contraction structures 1, respectively.

The above configuration can realize basic functions of the elastic actuator drive mechanism 10, such as gripping and conveying an object, due to multiple degrees of freedom.

Figure 3:
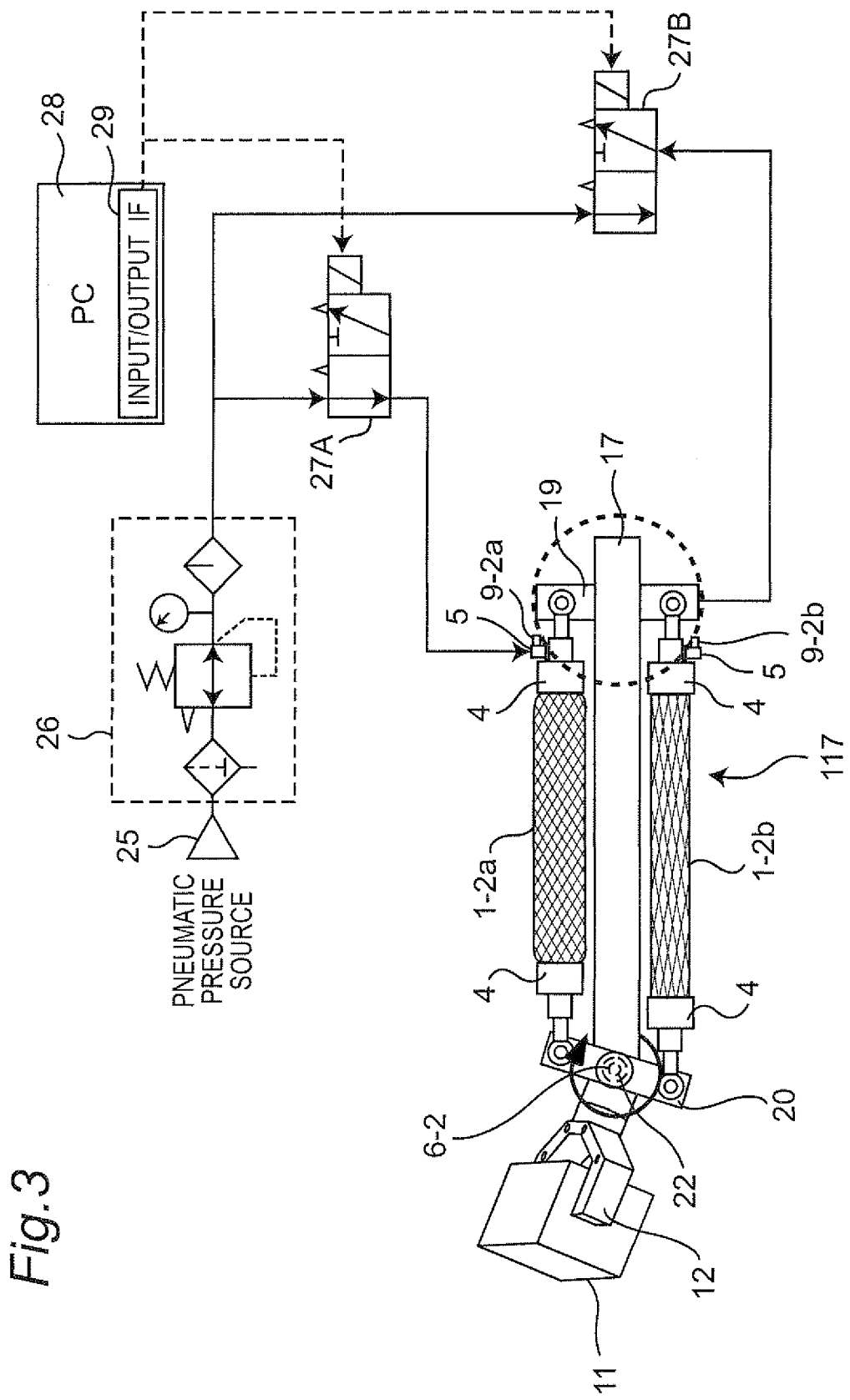
FIG. 3 is a view showing operations of a pneumatic pressure supply system according to the first embodiment of the present invention, for driving a robot arm by means of air serving as a compressive fluid.

FIG. 3 is a view showing a configuration of a pneumatic pressure supply system for driving the elastic actuator drive mechanism 10 according to the first embodiment of the present invention.

FIG. 3 illustrates only a relevant portion for driving to rotate positively and negatively the second joint shaft 6-2 in the elastic actuator drive mechanism 10, while the remaining portion does not appear in the figure. It is noted that a relevant portion for driving to rotate positively and negatively the first joint shaft 6-1 in the elastic actuator drive mechanism 10 is configured and operated similarly.

FIG. 3 illustrates a pneumatic pressure source 25 such as a compressor, and a pneumatic pressure adjustment unit 26 for adjusting the pneumatic pressure of the pneumatic pressure source 25 to output the pneumatic pressure thus adjusted. Each of four three-port flow rate control solenoid valves 27 provided as one example of the flow rate proportional solenoid valve controls the flow rate by driving a spool valve or the like with use of a force of an electromagnet. The control computer 28 is mounted with the input/output IF 29 such as a D/A board, and outputs a voltage command value to each of the four three-port flow rate control solenoid valves 27 so as to independently control the flow rate of air flowing through each of the fluid passage members 5.

Described next are operations of the pneumatic pressure supply system shown in FIG. 3. Highly pressurized air generated by the pneumatic pressure source 25 is reduced in pressure by the pneumatic pressure adjustment unit 26, e.g. adjusted to a constant pressure such as 600 [kPa]. The air thus obtained is supplied to the three-port flow rate control solenoid valves 27. The opening degree of each of the three-port flow rate control solenoid valves 27 is controlled in proportion to the voltage command value transmitted from the control computer 28 by way of the input/output IF 29. When a positive voltage command value is transmitted from the control computer 28 to the three-port flow rate control solenoid valve 27A that is connected to the elastic expansion/contraction structure 1-2a, the flow passage from the pneumatic pressure source 25 to the elastic expansion/contraction structure 1-2a is opened, and air of a flow rate in proportion to the absolute value of the voltage command value is supplied to the elastic expansion/contraction structure 1-2a. If a negative voltage command value is simultaneously transmitted to the three-port flow rate control solenoid valve 27B that is connected to the elastic expansion/contraction structure 1-2b, the flow passage from the elastic expansion/contraction structure 1-2b toward the atmospheric pressure is opened, and air of a flow rate in proportion to the absolute value of the voltage command value is discharged from the elastic expansion/contraction structure 1-2b into the atmosphere.

Therefore, as shown in FIG. 2, the elastic expansion/contraction structure 1-2a (corresponding to the lower elastic expansion/contraction structure in FIG. 2) is contracted in the entire length, and the elastic expansion/contraction structure 1-2b (corresponding to the upper elastic expansion/contraction structure in FIG. 2) is expanded in the entire length, so that the second joint shaft 6-2 is rotated to the right at a velocity in proportion to the absolute value of the voltage command value. On the other hand, when a negative voltage command value is transmitted from the control computer 28 to the three-port flow rate control solenoid valve 27A that is connected to the elastic expansion/contraction structure 1-2a and a positive voltage command value is transmitted therefrom to the three-port flow rate control solenoid valve 27B that is connected to the elastic expansion/contraction structure 1-2b, the elastic expansion/contraction structures 1-2a and 1-2b are operated reversely (specifically, the elastic expansion/contraction structure 1-2a is expanded in the entire length and the elastic expansion/contraction structure 1-2b is contracted in the entire length), so that the second joint shaft 6-2 is rotated to the left.

In this case, the flow of air supplied from the three-port flow rate control solenoid valve 27 to the elastic expansion/contraction structure 1 passes through the sealing member 4 due to the provision of the fluid passage member 5, and enters the tubular elastic body 2 to generate an internal pressure of the tubular elastic body 2. Each of the tubular elastic bodies 2 is expanded by the internal pressure thus generated. Radial deformation due to such expansion is restricted due to the restraint (regulation) of the fiber cords woven into the mesh shape of the deformation direction regulation member 3 and is converted to contraction in the axial length. Accordingly, the elastic expansion/contraction structure 1 is decreased in the entire length as illustrated as the upper elastic expansion/contraction structure in FIG. 3 (the lower elastic expansion/contraction structure in FIG. 2). On the other hand, when air is discharged from the three-port flow rate control solenoid valve 27 into the atmosphere to reduce the internal pressure of the tubular elastic body 2, expansion of the tubular elastic body 2 is cancelled by the elastic force thereof and the tubular elastic body 2 is restored. Accordingly, the elastic expansion/contraction structure 1 is expanded in the entire length as shown as the lower elastic expansion/contraction structure in FIG. 3 (the upper elastic expansion/contraction structure in FIG. 2).

As a result, assuming that each of the tubular elastic bodies is fixed at the right end in FIG. 2, such expansion and contraction cause a difference of a distance d at the left ends of the tubular elastic bodies 2. Therefore, the elastic expansion/contraction structures 1 according to the first embodiment are capable of functioning as linearly displaced actuators due to the control on supply of pneumatic pressures. The amounts of expansion and contraction are generally in proportion to the internal pressures of the elastic expansion/contraction structures 1. Therefore, the elastic expansion/contraction structures 1 can be each controlled in the entire length when the control computer 28 controls the three-port flow rate control solenoid valves 27 to control the flow rate of air supplied into the elastic expansion/contraction structures 1.

As described above, in the elastic actuator drive mechanism 10 shown in FIG. 1, in order that the elastic expansion/contraction structures 1-1a and 1-1b are driven antagonistically and the elastic expansion/contraction structures 1-2a and 1-2b are driven antagonistically, each of the three-port flow rate control solenoid valves 27 is provided to each of the pairs of the antagonistic elastic expansion/contraction structures 1 to configure the pneumatic pressure supply system similar to that shown in FIG. 3. The voltage command values are transmitted from the control computer 28 to the respective three-port flow rate control solenoid valves 27 by way of the input/output IF 29, so that all of the joint shafts 6-1 and 6-2 in the elastic actuator drive mechanism 10 are driven to positively or negatively rotate, simultaneously and independently from each other.

Figure 4:
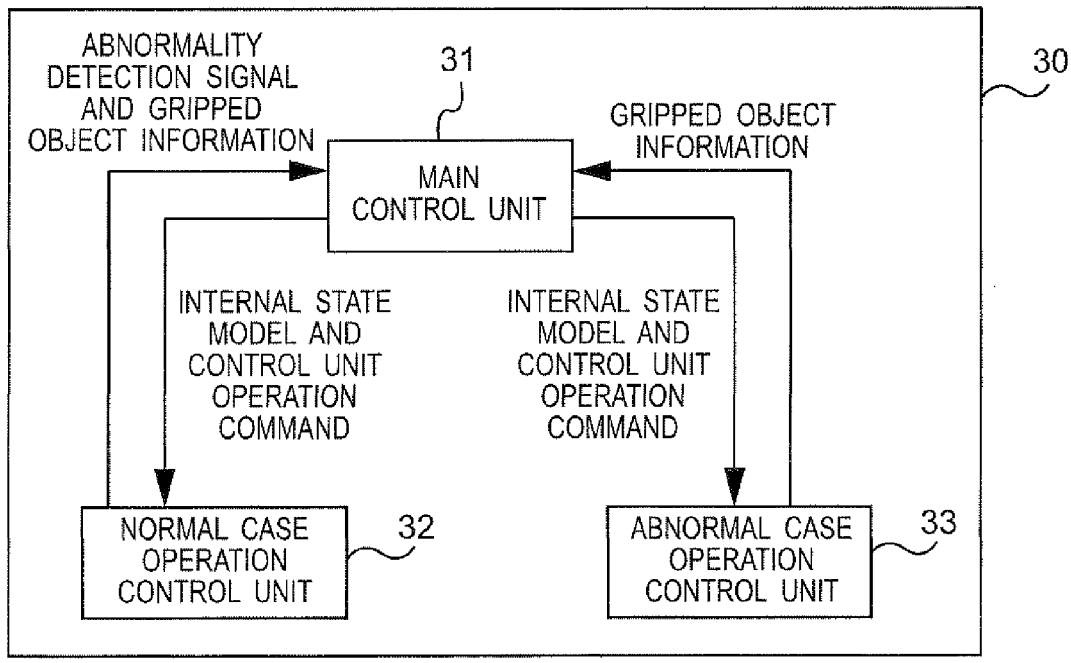
FIG. 4 is a block diagram showing an entire configuration of a control apparatus of the elastic actuator drive mechanism according to the first embodiment of the present invention.

FIG. 4 is a view showing the entire configuration of the control apparatus 30 in the elastic actuator drive mechanism 10 according to the first embodiment of the present invention. The control apparatus 30 may be mounted in the control computer 28. The control apparatus 30 includes a main control unit (provided as one example of a control unit or a control means) 31, a normal case operation control unit (a normal case operation control means) 32, and an abnormal case operation control unit (an abnormal case operation control means) 33. The normal case operation control unit 32 and the abnormal case operation control unit 33 each receive a control unit operation command signal from the main control unit 31 to operate exclusively from each other (more specifically, while one of the operation control units is operated, the other one of the operation control units is not operated). The main control unit 31 receives an abnormality detection signal and gripped object information from the normal case operation control unit 32. The main control unit 31 receives gripped object information from the abnormal case operation control unit 33. The main control unit 31 outputs an internal state model and a control unit operation command signal to each of the normal case operation control unit 32 and the abnormal case operation control unit 33.

Figure 5:
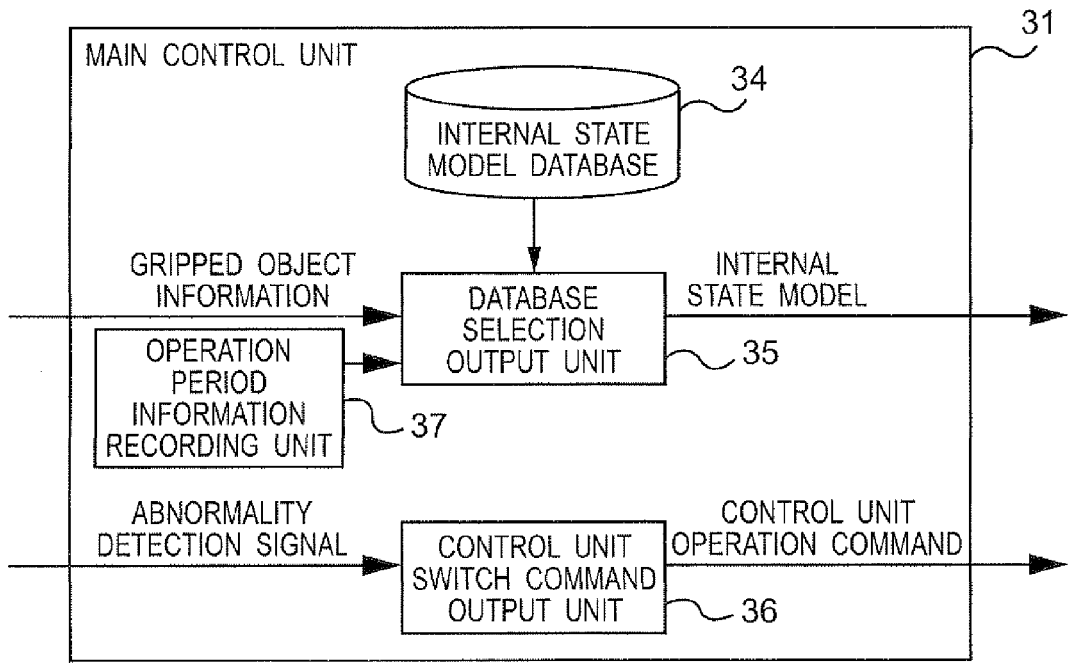
FIG. 5 is a block diagram showing a configuration of a main control unit according to the first embodiment of the present invention.

FIG. 5 is a view showing a specific configuration of the main control unit 31. The main control unit 31 includes an internal state model database 34, a database selection output unit 35, a control unit switch command output unit 36, and an operation period information recording unit 37.

The internal state model database 34 stores data (internal state models) on a relationship between a pressure difference $\Delta P$ of the pair of antagonistic elastic expansion/contraction structures 1 and an angle q of a corresponding joint. The internal state models configure reference information on the relationship between the pressure difference $\Delta P$ of the elastic actuators 1 and the joint angle q at each time point and each position when the elastic actuator drive mechanism 10 is operated in accordance with an operation program in a case where the encoders 8 are operated normally.

Figure 6A:
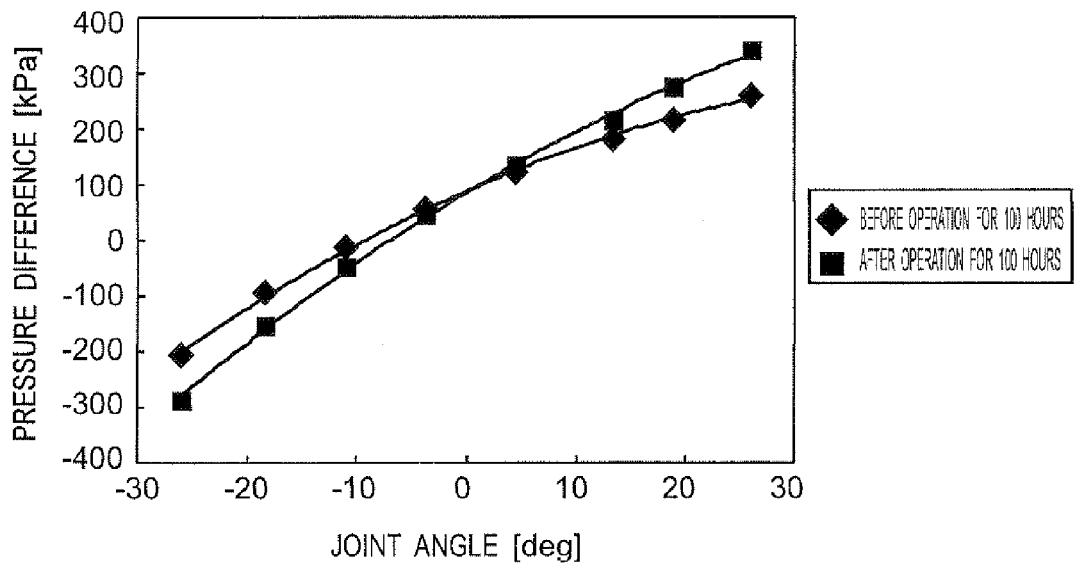
FIG. 6A is a graph indicating an example of an equation for an internal state model according to the first embodiment of the present invention.
Figure 6B:
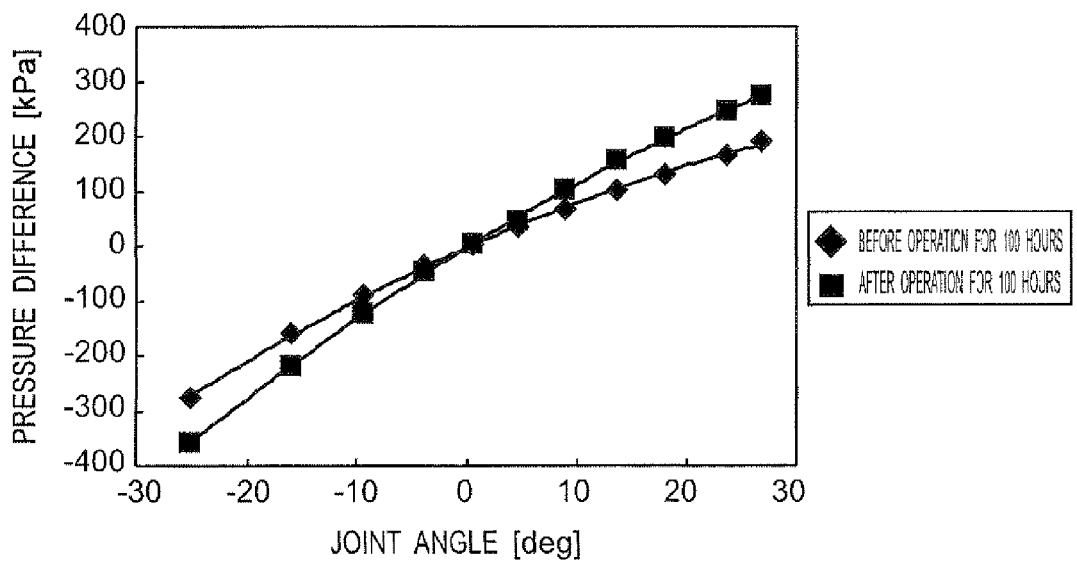
FIG. 6B is a graph indicating another example of the equation for the internal state model according to the first embodiment of the present invention.

FIGS. 6A and 6B are graphs each indicating an example of an equation stored in the internal state model database 34 and used for obtaining data on the relationship between the pressure difference $\Delta P$ and the angle q of the corresponding joint. In the example shown in each of FIGS. 6A and 6B, a quadratic equation indicated by the graph is stored in the internal state model database 34. The relationship between the pressure difference $\Delta P$ and the angle q of the corresponding joint of the elastic expansion/contraction structures 1 is varied by the weights, aging, and the like of the gripped objects. Accordingly, the internal state model database 34 stores a plurality of equations. In the example according to the present embodiment, the data is configured by types and aging of the gripped objects. FIG. 6A indicates an example of an equation for a case where no object is gripped by the elastic actuator drive mechanism 10, on the relationship between the elastic actuator drive mechanism 10 before being operated for 100 hours and the mechanism 10 after being operated for 100 hours. FIG. 6B indicates an example of the equation for a case where an object is gripped by the elastic actuator drive mechanism 10, on the relationship between the elastic actuator drive mechanism 10 before being operated for 100 hours and the mechanism 10 after being operated for 100 hours. Such equations for the respective joints are stored in the internal state model database 34.

Referring again to FIG. 5, the operation period information recording unit 37 records the operation period up to the present stage, of the elastic actuator drive mechanism 10 and outputs the result to the database selection output unit 35. The "operation period up to the present stage" indicates the accumulated operation period since the elastic actuator drive mechanism 10 is driven initially.

The database selection output unit 35 receives gripped object information to be described later, that is, information on whether or not an object is gripped, and the operation period transmitted from the operation period information recording unit 37, selects an appropriate piece of data in the internal state model database 34 in accordance with the information necessary for the selection, and outputs the selected result as the internal state model to one of the normal case operation control unit 32 and the abnormal case operation control unit 33, which is currently in operation.

In a case where gripped object information is received and an object is gripped, as well as the received operation period corresponds to 50 hours, outputted is an equation indicated by points of "♦" (rhombic signs in black) in FIG. 6A. In another case where the operation period corresponds to 150 hours, outputted is an equation indicated by points of "■" (quadrilateral signs in black) in FIG. 6A.

Figure 7:
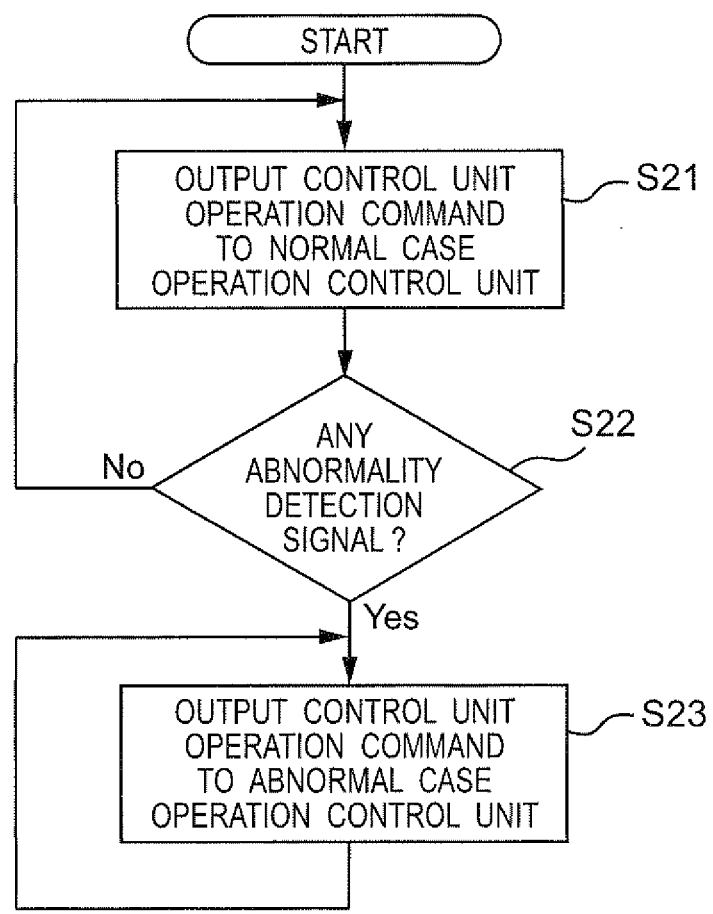
FIG. 7 is a flowchart showing operation steps of a control program for the main control unit according to the first embodiment of the present invention.

The control unit switch command output unit 36 receives an abnormality detection signal from the normal case operation control unit 32, and switches from the normal case operation control unit 32 to the abnormal case operation control unit 33 as the target of transmitting a control unit operation command. The abnormality detection signal is transmitted from the normal case operation control unit 32, which is to be detailed later, to the main control unit 31 when the normal case operation control unit 32 detects abnormality of an output detection unit. Actual operation steps of the control unit switch command output unit 36 are described below with reference to the flowchart in FIG. 7.

In Step S21, the control unit switch command output unit 36 outputs a control unit operation command to the normal case operation control unit 32. More specifically, after the elastic actuator drive mechanism 10 is activated, the normal case operation control unit 32 initially performs control operations as the control apparatus 30 (in other words, the control computer 28).

Then in Step S22, the main control unit 31 checks whether or not the normal case operation control unit 32 outputs an abnormality detection signal to the main control unit 31.

Detailed below is a case in Step S22 where the main control unit 31 determines that the normal case operation control unit 32 does not output any abnormality detection signal to the main control unit 31.

In this case, the process returns from Step S22 to Step S21, and the main control unit 31 outputs a control unit operation command to the normal case operation control unit 32.

By repetitively performing Steps S21 to S22 mentioned above, in a case where the normal case operation control unit 32 does not detect abnormality of the output measurement units, the control unit switch command output unit 36 continuously outputs control unit operation commands to the normal case operation control unit 32 so that the normal case operation control unit 32 keeps on operating.

Detailed below is a case in Step S22 where the main control unit 31 determines that the normal case operation control unit 32 outputs an abnormality detection signal to the main control unit 31.

In this case, the process proceeds from Step S22 to Step S23. In Step S23, the main control unit 31 outputs a control unit operation command to the abnormal case operation control unit 33.

Once Step S23 is performed, Step S23 is repetitively performed until the elastic actuator drive mechanism 10 completes its operation.

By repeating these steps, when the main control unit 31 determines that the normal case operation control unit 32 detects abnormality of the output measurement unit, the control unit switch command output unit 36 continuously outputs control unit operation commands to the abnormal case operation control unit 33. As a result, the abnormal case operation control unit 33 keeps on operating.

Figure 8:
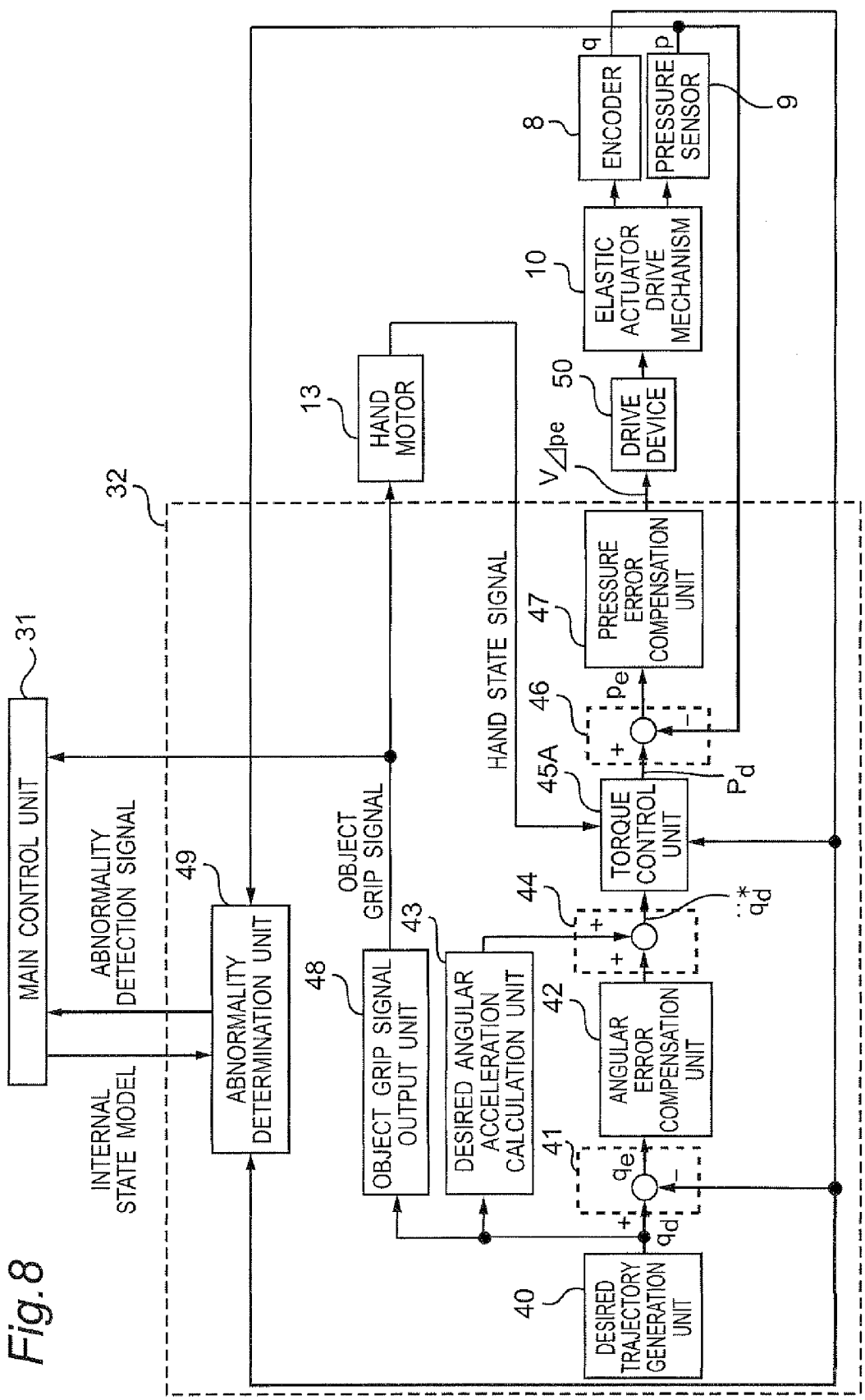
FIG. 8 is a control block diagram of a normal case operation control unit according to the first embodiment of the present invention.

FIG. 8 is a view showing a specific configuration of the normal case operation control unit 32 according to the first embodiment of the present invention. The normal case operation control unit 32 includes a desired trajectory generation unit (an example of a first desired output unit) 40, an output error calculation unit 41, an angular error compensation unit 42, a desired angular acceleration calculation unit 43, a corrected desired angular acceleration calculation unit 44, a normal case torque control unit 45A, a pressure error calculation unit 46, a pressure error compensation unit 47, an object grip signal output unit 48, and an abnormality determination unit 49. FIG. 8 illustrates a drive device 50 that corresponds to the flow rate proportional solenoid valves 27 (27A and 27B) and the input/output IF 29 shown in FIG. 1, and the elastic actuator drive mechanism 10 also shown in FIG. 1, which is controlled by the control apparatus 30 of the elastic actuator drive mechanism. The elastic actuator drive mechanism 10 outputs current values of the joint angles as examples of measurement values (joint angle vectors) $q=[q_1, q_2]^T$ which are measured by the encoders 8 of the respective joint shafts 6-1 and 6-2, and internal pressures $P=[P_{1a}, P_{1b}, P_{2a}, P_{2b}]^T$ of the elastic expansion/contraction structures 1 as examples of internal state measurement values that are measured by the pressure sensors 9 of the respective elastic expansion/contraction structures 1. In this case, $q_1$ and $q_2$ are the joint angles of the first joint shaft 6-1 and the second joint shaft 6-2, which are measured respectively by the encoders 8. $P_{1a}$, $P_{1b}$, $P_{2a}$, and $P_{2b}$ are the internal pressures of the elastic expansion/contraction structures 1-1a, 1-1b, 1-2a, and 1-2b, which are measured respectively by the pressure sensors 9 (9-1a, 9-1b, 9-2a, and 9-2b). The hand motor 13, which is used for opening and closing the hand 12, closes the hand 12 to grip an object upon receipt of an object grip signal (when the object grip signal is outputted), and opens the hand 12 to release the object upon no receipt of any object grip signal (when no object grip signal is outputted).

The desired trajectory generation unit 40 outputs a desired joint angle vector (as an example of an output desired value) $q_d$ for realizing a desired operation of the elastic actuator drive mechanism 10 to the output error calculation unit 41, the desired angular acceleration calculation unit 43, and the object grip signal output unit 48. The desired trajectory generation unit 40 preliminarily stores the operation program for the elastic actuator drive mechanism 10. The desired operations of the elastic actuator drive mechanism 10 preliminarily include desired angle vectors $q_{dt}=[q_{dt1}, q_{dt2}]^T$ ($q_{dt=0}$, $q_{dt=1}$, $q_{dt=2}$, ... ) at respective time points (t=0, t=$t_1$, t=$t_2$, ... ) and at respective positions, in accordance with tasks to be achieved. The desired trajectory generation unit 40 complements the tracks between the respective positions by using polynomial interpolation in accordance with the information on the angles ($q_{dt=0}$, $q_{dt=1}$, $q_{dt=2}$, ... ) at the respective time points (t=0, t=$t_1$, t=$t_2$, ... ) and the respective positions, and generates a desired joint angle vector $q_d=[q_{d1}, q_{d2}]^T$.

The output error calculation unit 41 receives the desired joint angle vector $q_d$ transmitted from the desired trajectory generation unit 40 and the outputs q from the encoders 8, calculates angular error vectors $q_e = q_d - q$, and outputs the angular error vectors $q_e$ as examples of output errors.

The angular error compensation unit 42 receives the angular error vectors $q_e$ transmitted from the output error calculation unit 41, and outputs angular error correction command values $\Delta P_{qe}$ as examples of control command values to the corrected desired angular acceleration calculation unit 44.

The desired angular acceleration calculation unit 43 receives the desired joint angle vector $q_d$ transmitted from the desired trajectory generation unit 40, and a desired angular acceleration $$\ddot{q}_d \quad \text{[Expression 1]}$$

is calculated and transmitted to the corrected desired angular acceleration calculation unit 44.

The corrected desired angular acceleration calculation unit 44 receives an output value $$\ddot{q}_d \quad \text{[Expression 2]}$$

of the desired angular acceleration calculation unit 43 and the angular error correction command values $\Delta P_{qe}$ transmitted from the angular error compensation unit 42, and a corrected desired angular acceleration as an example of a control command value $$\ddot{q}^*_d \quad \text{[Expression 3]}$$

is calculated and transmitted to the normal case torque control unit 45A.

The normal case torque control unit 45A calculates, from the corrected desired angular acceleration $$\ddot{q}^*_d \quad \text{[Expression 4]}$$

transmitted from the corrected desired angular acceleration calculation unit 44 and a dynamics parameter, a desired joint torque $\tau_d$, and further calculates desired pressure values (each example of desired internal state information) $P_d$ of the elastic expansion/contraction structures 1 at the corresponding (focused) joint from the desired joint torque $\tau_d$ and the output q received from the encoder 8. Examples of the dynamics parameter include each of links (the support members 16 and 17) of the elastic actuator drive mechanism 10, the weight of the conveyed object 11, the center of gravity of the conveyed object 11, an inertia matrix, and the like. The normal case torque control unit 45A outputs the calculated desired pressure values $P_d$ to the pressure error calculation unit 46. The desired joint torque $\tau_d$ can be calculated, for example, by using an equation of motion for the elastic actuator drive mechanism 10, in accordance with the following expression.

$$\tau_d = M(q) \cdot \ddot{q}^*_d + C(q,\dot{q}) + g(q) \quad \text{[Expression 5]}$$

$$M(q) \text{ and } C(q,\dot{q}) \quad \text{[Expression 6]}$$

configure coefficient matrixes including the dynamics parameters of the conveyed object 11 and the elastic actuator drive mechanism 10, and the expression $$g(q) \quad \text{[Expression 7]}$$

is a gravity term related to the weights of the conveyed object 11 and the elastic actuator drive mechanism 10.

Figure 9:
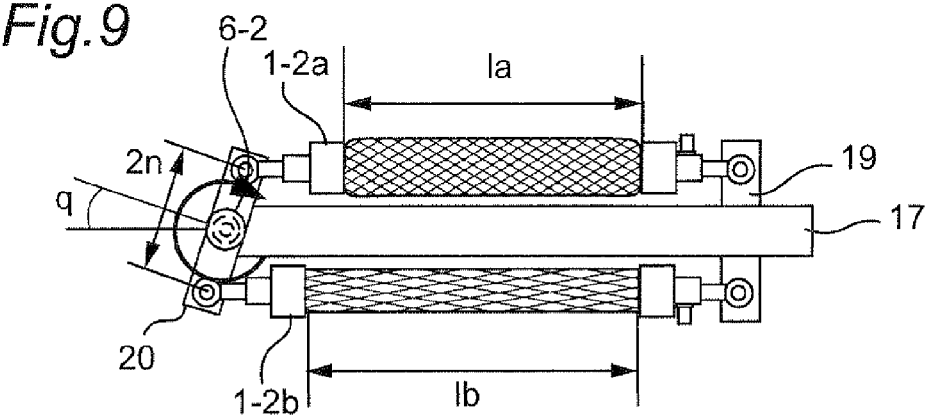
FIG. 9 is a view partially indicating a calculation method of a torque control unit according to the first embodiment of the present invention.
Figure 10:
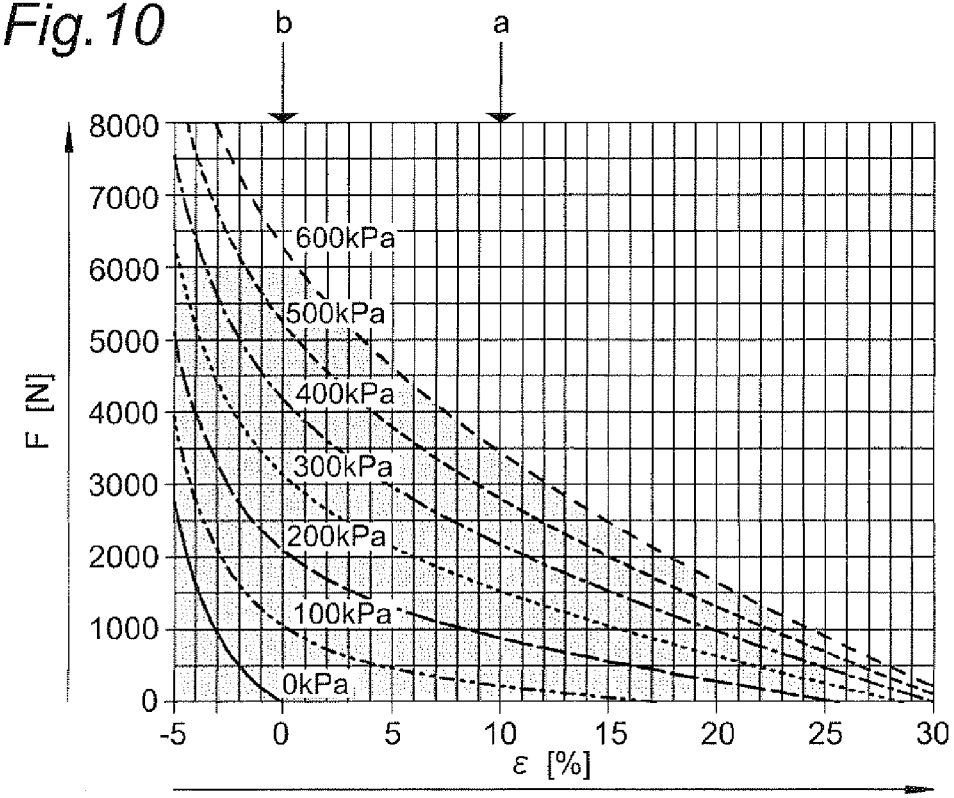
FIG. 10 is a graph indicating an example of characteristics of the elastic actuators according to the first embodiment of the present invention.

Described with reference to FIGS. 9 and 10 is an example of a method of calculating the desired pressure values $P_d$ of the elastic expansion/contraction structures 1 at one of the joints from the obtained desired joint torque $\tau_d$ and the joint angle q.

FIG. 9 is a view showing the lengths of the elastic expansion/contraction structures 1-2a and 1-2b at a certain joint angle. FIG. 10 is a graph indicating the relationship among a tensile force F, a strain amount s, and a pressure P, which are the characteristics of the elastic expansion/contraction structures 1-2a and 1-2b adopted in FIG. 9. A geometrical parameter of a corresponding one of the joints relevant to the elastic expansion/contraction structures 1-2a and 1-2b shown in FIG. 9 and the characteristics of the elastic expansion/contraction structures 1-2a and 1-2b shown in FIG. 10 are preliminarily stored in the normal case torque control unit 45A.

As shown in FIG. 9, the normal case torque control unit 45A firstly calculates, from the joint angle q, lengths of the pair of antagonistic elastic expansion/contraction structures 1-2a and 1-2b at the corresponding (focused) joint (the second joint in this example). As shown in FIG. 9, in an example of a case where the two elastic expansion/contraction structures 1-2a and 1-2b are away from each other by a distance 2n and have the joint angle q (the support body 20 is inclined at the angle q from the axes of the elastic expansion/contraction structures 1-2a and 1-2b), the difference between the lengths of the elastic expansion/contraction structures 1-2a and 1-2b is $$2n \cdot \sin q \quad \text{[Expression 8]}$$

and assuming that both of the elastic expansion/contraction structures 1-2a and 1-2b have a length $l_0$ when q=0, the normal case torque control unit 45A can obtain the lengths of the elastic expansion/contraction structures 1-2a and 1-2b in accordance with the following equations.

$$l_a = l_0 - n \cdot \sin q$$

$$l_b = l_0 + n \cdot \sin q \quad \text{[Expression 9]}$$

Further, assuming that elastic expansion/contraction structures 1-2a and 1-2b have a natural length l, the normal case torque control unit 45A can obtain the respective strain amounts expressed as $\epsilon_a = l_a/l$ and $\epsilon_b = l_b/l$.

Assuming that the elastic expansion/contraction structures 1-2a and 1-2b at one of the joints have a difference $F_e$ between the respective tensile forces F, the difference $F_e$ can be obtained, from the desired joint torque $\tau_d$, as $$F_e = \frac{\tau_d}{n} \quad \text{[Expression 10]}$$

by the normal case torque control unit 45A.

Under the above conditions, namely, the strain amounts $\epsilon$ of the elastic expansion/contraction structures 1-2a and 1-2b and the difference $F_e$ between the tensile forces F thereof, as well as one predetermined condition (e.g. the two antagonistic elastic expansion/contraction structures 1-2a and 1-2b each have an average pressure of 300 kPa, or the elastic expansion/contraction structures 1-2a and 1-2b are different in pressure by 200 kPa), the normal case torque control unit 45A can obtain, in accordance with the relationship indicated in FIG. 10, desired pressure values $P_d$ of the respective elastic expansion/contraction structures 1-2a and 1-2b.

In the example of FIG. 9, assume that $\epsilon_a$=5 [%], $\epsilon_b$=0 [%], and $F_e$=2000 [N], as well as that the average pressure is 250 [kPa] as the predetermined condition.

Firstly, from $\epsilon_a$ and $\epsilon_b$, the states of the elastic expansion/contraction structures 1-2a and 1-2b appear on vertical lines indicated by arrows a and b in FIG. 10.

Then, in accordance with the difference $F_e$ between the tensile forces F, the elastic expansion/contraction structures 1-2a and 1-2b are determined to be in the state of having a distance of 2000 N on the vertical axis of FIG. 10.

When the pressures of the elastic expansion/contraction structures 1-2a and 1-2b, which satisfy the above conditions as well as the average pressures of 250 [kPa], are searched on the graph of FIG. 10 by the normal case torque control unit 45A, the pressure of the elastic expansion/contraction structure 1-2a can be obtained to be 400 [kPa] and the pressure of the elastic expansion/contraction structure 1-2b can be obtained to be 100 [kPa] by the normal case torque control unit 45A. These pressures thus obtained correspond to the desired pressure values $P_d$.

The dynamics parameters corresponding to the conveyed object 11 are preliminarily stored in the normal case torque control unit 45A. When the hand 12 is closed to grip the object 11 in accordance with a hand state signal from the hand 12, the normal case torque control unit 45A uses the dynamics parameter for the case where an object is gripped. On the other hand, when the hand 12 is opened and does not grip the object 11, the normal case torque control unit 45A uses the dynamics parameter for the case where no object is gripped. Therefore, $$M(q), C(q,\dot{q}), \text{ and } g(q) \qquad \text{[Expression 11]}$$

are varied.

The pressure error calculation unit 46 subtracts the pressures P transmitted from the pressure sensors 9 from the desired pressure values $P_d$ of the elastic expansion/contraction structures 1-2a and 1-2b transmitted from the normal case torque control unit 45A, to obtain pressure errors $P_e$, and outputs the calculated pressure errors $P_e$ to the pressure error compensation unit 47.

The pressure error compensation unit 47 receives the pressure errors $P_e$ from the pressure error calculation unit 46, calculates a pressure difference error correction output $V\Delta p_e$, and outputs the calculated pressure difference error correction output $v\Delta p_e$ to a drive device 50 of the elastic actuator drive mechanism 10. The pressure difference error correction output $V\Delta p_e$ is transmitted as a voltage command value to each of the three-port flow rate control solenoid valves 27 (27A and 27B) of the pneumatic pressure supply system by way of the input/output IF 29 such as the D/A board of the drive device 50. Then, the joint shafts 6-1 and 6-2 are positively or negatively rotated independently from each other to operate the elastic actuator drive mechanism 10.

The object grip signal output unit 48 outputs an object grip signal to the hand motor 13 and the main control unit 31 at a predetermined desired position. In the present embodiment, the elastic actuator drive mechanism 10 as one example of a robot has a predetermined task. Assumed is an exemplary case where the hand 12 grips the object 11 to be conveyed at a certain position, shifts the conveyed object 11, places the conveyed object 11 (the hand 12 releases the conveyed object 11) at a different position. It is thus determined whether or not to output an object grip signal in accordance with a desired position. The present invention is not limited to this case. Alternatively, an operator may press a hand open/close button to close the hand 12 to grip the object 11 to be conveyed, and the operator may press again the hand open/close button to open the hand 12 to release the conveyed object 11.

The abnormality determination unit 49 receives the outputs q of the encoders 8, the outputs P of the pressure sensors 9, and the internal state model in the main control unit 31, so as to function as the abnormality determination unit of the encoders 8 as one example of the output measurement unit.

Figure 11:
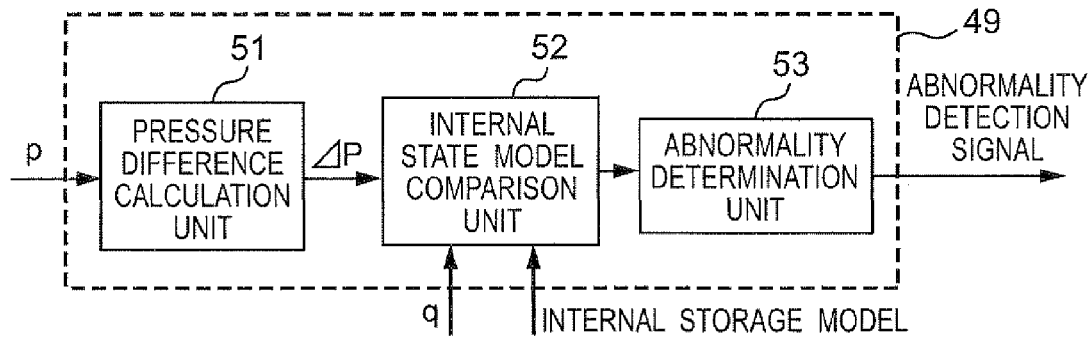
FIG. 11 is a view showing internal blocks of an abnormality determination unit according to the first embodiment of the present invention.

FIG. 11 is a detailed view of the abnormality determination unit 49, which includes a pressure difference calculation unit 51, an internal state model comparison unit 52, and an abnormality determination unit 53.

The pressure difference calculation unit 51 receives the pressures P of the respective elastic expansion/contraction structures 1, calculates the pressure difference $\Delta P$ between the pair of antagonistic elastic expansion/contraction structures 1, and outputs the obtained pressure difference $\Delta P$ to the internal state model comparison unit 52.

The internal state model comparison unit 52 receives the pressure difference $\Delta P$ transmitted from the pressure difference calculation unit 51, the joint angle q transmitted from corresponding one of the encoders 8, and the internal state model transmitted from the internal state model database in the main control unit 31. The internal state model comparison unit 52 then compares the equation on the relationship between the pressure difference $\Delta P$ and the joint angle q of the internal state model, with the relationship between the current pressure difference $\Delta P$ and the current joint angle q (upon comparison), to obtain by how much percent the output q of the encoder 8 is deviated from the joint angle q of the internal state model and output the obtained result to the abnormality determination unit 53.

The abnormality determination unit 53 determines whether or not the output q of the encoder 8 is abnormal based on the output of the internal state model comparison unit 52 indicating by how much percent the output q of the encoder 8 is deviated. When the output q is abnormal, the abnormality determination unit 53 outputs an abnormality detection signal to the main control unit 31. The abnormality determination unit 53 determines whether or not the output q is abnormal under a predetermined condition, such that the output q is determined to be abnormal immediately in a case where the output q of the encoder 8 is deviated by 50% or more from the joint angle q of the internal state model, or such that the output q is determined to be abnormal in a case where the output q of the encoder 8 is deviated from the joint angle q of the internal state model by 20% or more and less than 50% continuously for 10 or more seconds. Continuous deviation for 10 or more seconds can be measured with use of a built-in timer.

Figure 12:
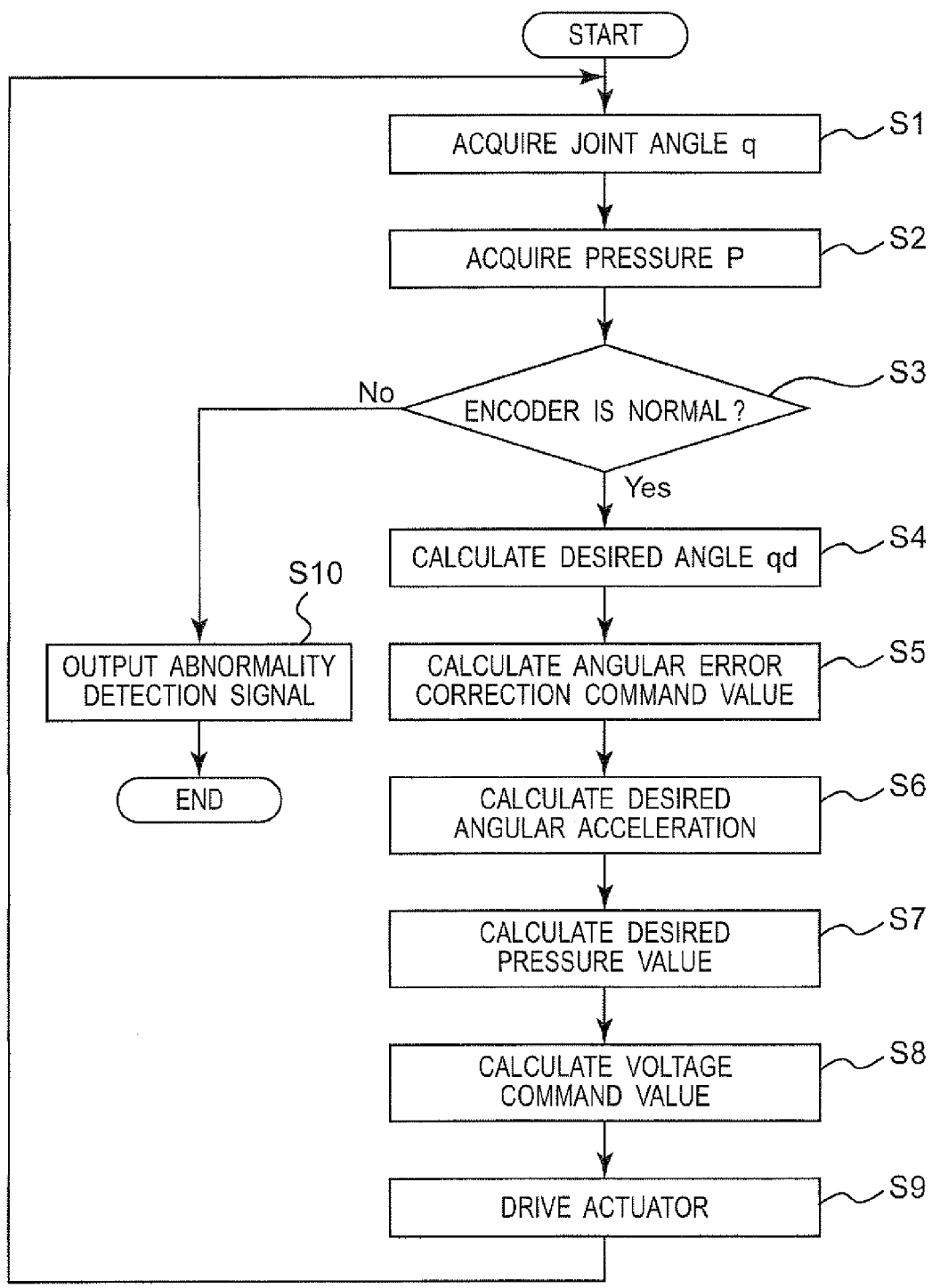
FIG. 12 is a flowchart showing operation steps of a control program for the normal case operation control unit according to the first embodiment of the present invention.

Described with reference to the flowchart of FIG. 12 are actual operation steps of the control program for the normal case operation control unit 32 in accordance with the above principle.

In Step S1, the measurement value (the joint angle q) of the output of the elastic actuator drive mechanism 10, which is measured by each of the encoders 8, is received by the abnormality determination unit 49 of the normal case operation control unit 32 in the control apparatus 30, and the like.

Then in Step S2, the measurement value (the pressure P) of the internal state of the elastic actuator drive mechanism 10, which is measured by each of the pressure sensors 9, is received by the abnormality determination unit 49 of the normal case operation control unit 32 in the control apparatus 30, and the like.

Next in Step S3, the abnormality determination unit 49 determines whether or not the encoders 8 are abnormal, based on the outputs q of the encoders 8, the outputs P of the pressure sensors 9, and the internal state model in the main control unit 31.

Described below is a case where the abnormality determination unit 49 determines that the encoders 8 are not abnormal (are normal) in Step S3. In this case, the process proceeds from Step S3 to Step S4.

In Step S4, in accordance with the operation program for the elastic actuator drive mechanism 10 preliminarily stored in the desired trajectory generation unit 40, the desired trajectory generation unit 40 calculates a desired value (a desired joint angle vector $q_d$) transmitted from the elastic actuator drive mechanism 10.

Then in Step S5, from the output of the desired trajectory generation unit 40 and the output q of each of the encoders 8, the output error calculation unit 41 obtains an angular error vector $q_e$. Thereafter, from the angular error vector $q_e$ of the output error calculation unit 41, the angular error compensation unit 42 calculates an angular error correction command value $\Delta P_{qe}$.

Next in Step SG, from the desired joint angle vector $q_d$ of the desired trajectory generation unit 40, a desired angular acceleration $$\ddot{q}_d \qquad \text{[Expression 12]}$$

is calculated by the desired angular acceleration calculation unit 43.

Subsequently in Step S7, from the desired angular acceleration $$\ddot{q}_d \qquad \text{[Expression 13]}$$

of the desired angular acceleration calculation unit 43 and the angular error correction command value $\Delta P_{qe}$ of the angular error compensation unit 42, a corrected desired angular acceleration $$\ddot{q}^*_d \qquad \text{[Expression 14]}$$

is calculated by the corrected desired angular acceleration calculation unit 44. Then, from the corrected desired angular acceleration $$\ddot{q}^*_d \qquad \text{[Expression 15]}$$

of the corrected desired angular acceleration calculation unit 44 and the dynamics parameter, the normal case torque control unit 45A calculates desired pressure values $P_d$.

Next in Step S8, from the desired pressure values $P_d$ of the normal case torque control unit 45A, the pressure error calculation unit 46 calculates a pressure error $P_e$. Further, the pressure error compensation unit 47 calculates a pressure difference error correction output $V\Delta p_e$, in other words, a voltage command value, from the pressure error $P_e$ of the pressure error calculation unit 46.

Next in Step S9, the voltage command value (the pressure difference error correction output $V\Delta p_e$) calculated by the pressure error compensation unit 47 is transmitted to the drive device 50, which thus drives the elastic actuator drive mechanism 10.

Steps S1 to S9 are performed repetitively as a calculation loop for the control operations, so that the elastic actuator drive mechanism 10 is controlled.

Described below is another case where the encoder 8 is determined to be abnormal (not normal) in Step S3. In this case, the process proceeds from Step 93 to Step S10. In Step S10, the abnormality determination unit 49 outputs an abnormality detection signal to the main control unit 31.

By performing Steps S1 to S4 and S10 described above, an abnormality detection signal is outputted and transmitted to the main control unit 31 upon detection of abnormality of the encoder 8, so that the control unit 31 to perform the control operations is switched from the normal case operation control unit 32 to the abnormal case operation control unit 33.

Figure 13:
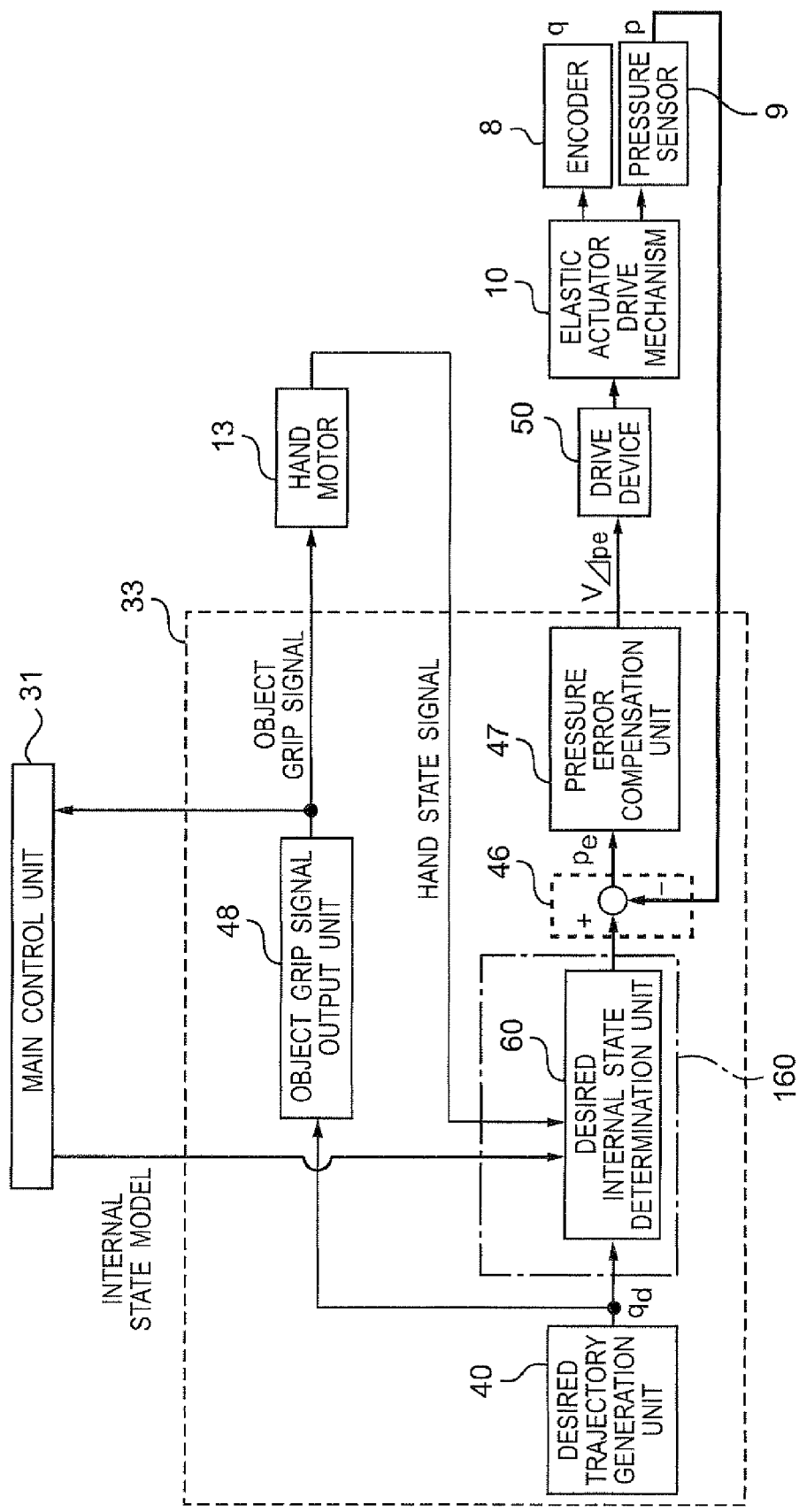
FIG. 13 is a control block diagram of an abnormal case operation control unit according to the first embodiment of the present invention.

FIG. 13 is a view showing a specific configuration of the abnormal case operation control unit according to the first embodiment of the present invention. The abnormal case operation control unit 33 includes the desired trajectory generation unit (as one example of a second desired output unit) 40, a desired internal state determination unit (a first desired internal state calculation unit) 60, a pressure error calculation unit 46, a pressure error compensation unit 47, and an object grip signal output unit 48.

Because the desired trajectory generation unit 40 operates similarly to the desired trajectory generation unit 40 of the normal case operation control unit 32, description thereof is omitted. The desired internal state determination unit (the first desired internal state calculation unit) 60 to be described later functions as an example of a desired internal state information acquisition unit 160.

The desired internal state determination unit 60 receives the desired joint angle vector $q_d$ from the desired trajectory generation unit 40, and a desired pressure difference (a desired value of the pressure difference) $\Delta P_d = [\Delta P_{1d}, \Delta P_{2d}]^T$ is calculated from the desired joint angle vector $q_d$. Further, from the desired pressure difference, the desired internal state determination unit 60 calculates desired pressure values $P_d = [P_{11d}, P_{1bd}, P_{2ad}, P_{2bd}]^T$ of the respective elastic actuators 1, and the desired internal state determination unit 60 outputs the desired pressure values $P_d$ to the pressure error calculation unit 46.

Figure 14:
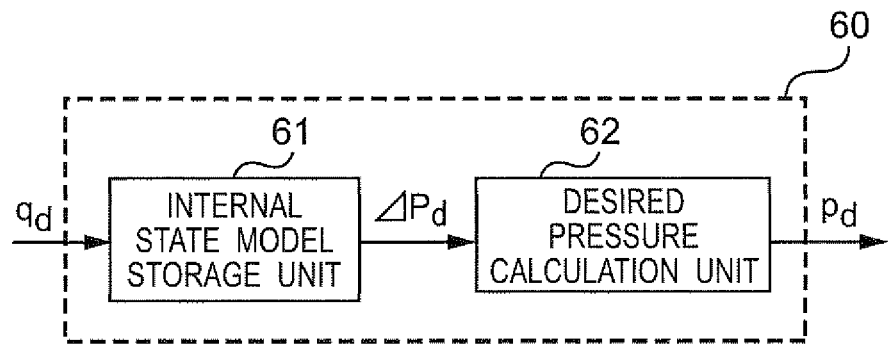
FIG. 14 is a block diagram showing a detailed configuration of a desired internal state determination unit according to the first embodiment of the present invention.

FIG. 14 is a detailed view of the desired internal state determination unit 60, which includes an internal state model storage unit 61 and a desired pressure calculation unit 62.

The internal state model stored in the internal state model storage unit 61 is transmitted from the main control unit 31 to the abnormal case operation control unit 33, as described above. With use of the internal state model stored in the internal state model storage unit 61, the desired pressure difference $\Delta P_d$ of the elastic actuators 1 at each of the joints is calculated from the received desired joint angle vector $q_d$, and the calculated desired pressure difference $\Delta P_d$ is transmitted to the desired pressure calculation unit 62.

The desired pressure calculation unit 62 calculates the desired pressure values $P_d$ of the respective elastic actuators 1 from the desired pressure difference $\Delta P_d$ received from the internal state model storage unit 61, and outputs the calculated desired pressure values $P_d$ to each of the object grip signal output unit 48 and the desired internal state determination unit 60. In order to calculate the desired pressure values $P_d$ of the respective elastic actuators 1 from the desired pressure difference $\Delta P_d$, the desired pressure calculation unit 62 stores one predetermined condition (e.g. the two antagonistic elastic actuators 1 each have an average pressure of 300 kPa, or the elastic actuators 1 are different in pressure by 200 kPa). The desired pressure calculation unit 62 calculates the desired pressure values $P_d$ in accordance with the condition and the received desired pressure difference $\Delta P_d$. For example, in a case where the stored condition is the average pressure of 250 kPa and the desired pressure difference $\Delta P_d$ is 400 kPa for the joint shaft 6-1, the desired pressure values $P_{1ad}$ and $P_{1bd}$ of the respective elastic actuators 1 need to satisfy the following equations.

$$400 = P_{1ad} - P_{1bd} \qquad \text{[Expression 16]}$$

$$250 = \frac{(P_{1ad} + P_{1bd})}{2}$$

Obtained in accordance with the above two equations can be $P_{1ad}$=450 kPa and $P_{1bd}$=50 kPa.

Referring again to FIG. 13, the internal state error calculation unit 46 subtracts the pressures P transmitted from the pressure sensors 9, from the desired pressure values $P_d$ of the elastic actuators 1 transmitted from the desired internal state determination unit 60, respectively, so as to calculate pressure errors $\Delta P_e$, which are transmitted to the pressure error compensation unit 47.

Figure 15:
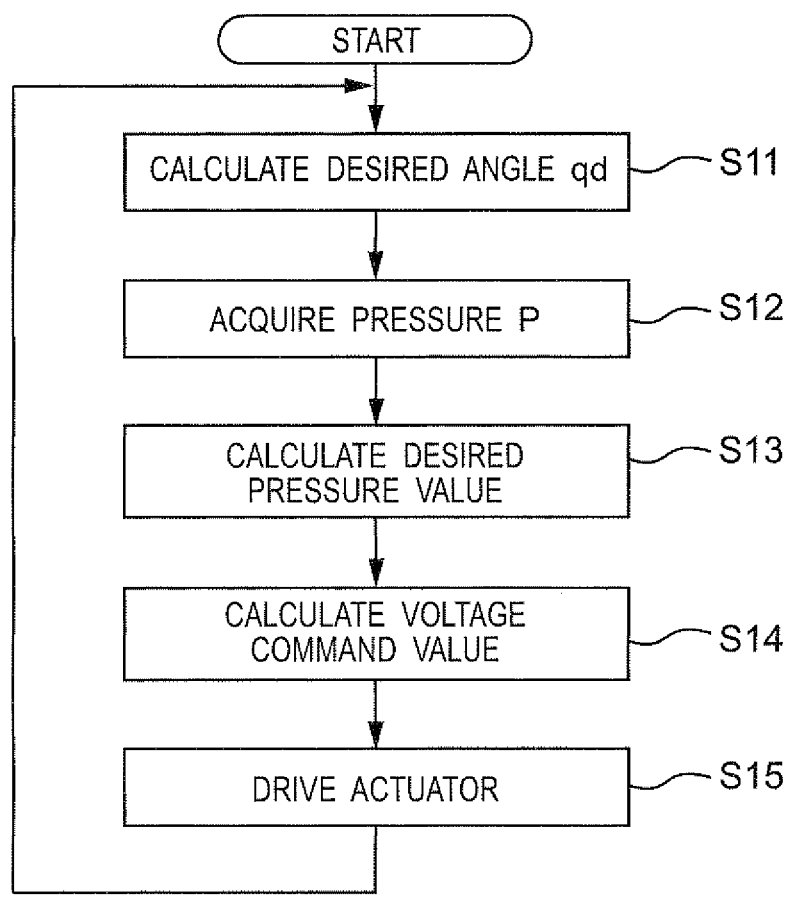
FIG. 15 is a flowchart showing operation steps of a control program for the abnormal case operation control unit according to the first embodiment of the present invention.

With reference to the flowchart of FIG. 15 for the abnormal case operation control unit, described next are actual operation steps of the control program in accordance with the above principle.

In Step S11, in accordance with the operation program for the elastic actuator drive mechanism 10 preliminarily stored in the desired trajectory generation unit 40, the desired trajectory generation unit 40 calculates a desired value (a desired angle $q_d$) of the output of the elastic actuator drive mechanism 10.

Then in Step S12, the measurement values (the pressures P) of the internal state of the elastic actuator drive mechanism 10, which are measured by the pressure sensors 9, are taken by the pressure error calculation unit 46 of the abnormal case operation control unit 33 in the control apparatus 30.

Next in Step S13, based on the desired joint angle vector $q_d$ of the desired trajectory generation unit 40, the desired internal state determination unit 60 determines desired pressure values $P_d$, which are transmitted to the internal state error calculation unit 46.

Subsequently in Step S14, the internal state error calculation unit 46 calculates differences between the desired pressure values $P_d$ of the desired internal state determination unit 60 and the current pressures P measured by the pressure sensors 9, namely, the pressure errors $\Delta P_e$. Further, from the pressure errors $\Delta P_e$ of the internal state error calculation unit 46, the pressure error compensation unit 47 calculates the pressure difference error correction output $V\Delta p_e$, namely, the voltage command value.

Next in Step S15, the voltage command value (the pressure difference error correction output $V\Delta p_e$) calculated by the pressure error compensation unit 47 is transmitted to the drive device 50, which therefore drives the elastic actuator drive mechanism.

Steps S1 to S9 detailed above are performed repetitively as a calculation loop for the control operations, so that the elastic actuator drive mechanism 10 is controlled.

As described above, the control apparatus 30 according to the first embodiment includes the main control unit 31, the normal case operation control unit 32, and the abnormal case operation control unit 33. Further, the normal case operation control unit 32 is provided with the abnormality determination unit 49. In the above configuration, the abnormality determination unit 49 determines whether or not the encoders 8 are normal. When the abnormality determination unit 49 determines that any one of the encoders 8 is not normal, the main control unit 31 switches from the normal case operation control unit 32 to the abnormal case operation control unit 33. As a result, even if any one of the encoders 8 is in trouble, the elastic actuator drive mechanism 10 is controlled not to stop immediately but to be operable continuously and safely.

Further, the desired angle vector $q_{dt}$ stored in the desired trajectory generation unit 40 in the abnormal case operation control unit 33 may be made different from the desired joint angle vector $q_d$ stored in the desired trajectory generation unit 40 in the normal case operation control unit 32. The desired joint angle vector is made of not ordinarily and repetitively conveying the conveyed object 11 but conveying the conveyed object 11 to a safe position, placing the conveyed object 11, and then stopping. In this case, the elastic actuator drive mechanism 10 can be controlled more safely.

(Second Embodiment)

Description is made to an example of specific configuration of a control apparatus 30 of an elastic actuator drive mechanism 10 according to a second embodiment of the present invention.

Figure 16:
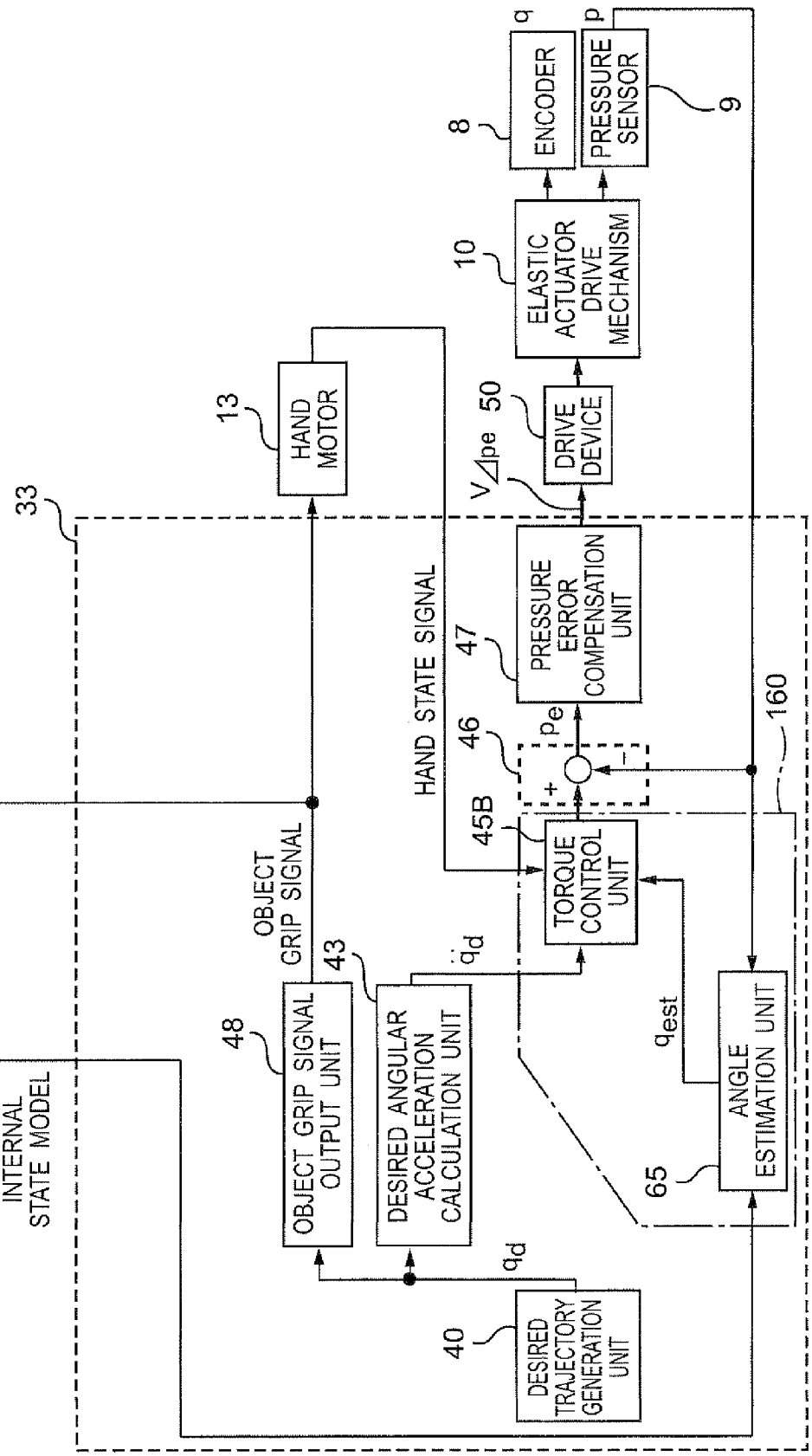
FIG. 16 is a control block diagram of an abnormal case operation control unit according to a second embodiment of the present invention.

FIG. 16 is a view showing a specific configuration of an abnormal case operation control unit 33 according to the second embodiment of the present invention. The abnormal case operation control unit 33 includes a desired trajectory generation unit 40, an abnormal case torque control unit (a second desired internal state information calculation unit) 45B, a desired angular acceleration calculation unit 43, a pressure error calculation unit 46, a pressure error compensation unit 47, an angle estimation unit (as one example of an output estimation unit (output estimation unit)) 65, and an object grip signal output unit 48. The angle estimation unit (the output estimation unit) 65 and the abnormal case torque control unit (the second desired internal state information calculation unit) 45B, which are to be described later, function as another example of the desired internal state information acquisition unit 160.

The angle estimation unit 65 obtains an estimated joint angle $q_{est}$ as an estimated value of a joint angle, from an internal state model transmitted from a main control unit 31 and pressures P of the elastic actuators 1 transmitted from the pressure sensors 9, and transmits the estimated joint angle thus obtained to the abnormal case torque control unit 45B. For such estimation, the angle estimation unit 65 obtains a pressure difference $\Delta P$ of the joint from the pressures P, and uses the equations indicated by the graphs in FIGS. 6A and 6B to estimate the joint angle.

For example, in a case where no object is gripped and the operation period corresponds to 10 hours, the angle estimation unit 65 receives, as the internal state model, the equation on the relationship between the joint angle q and the pressure error $\Delta P$ as indicated by the graph of points of "♦" (rhombic signs in black) in FIG. 6A. When received pressures $P_{1a}$ and $P_{1b}$ of the pair of antagonistic elastic actuators 1-1a and 1-1b at the joint shaft 6-1 are 500 kPa and 300 kPa, respectively, the pressure difference $\Delta P$=500−300=200 is obtained. By substituting the pressure difference $\Delta P$ into the equation, the angle estimation unit 65 estimates the joint angle q to be 20 deg.

The abnormal case torque control unit 45B calculates a desired joint torque $\tau_d$ from the desired angular acceleration $$\ddot{q}_d \qquad \text{[Expression 17]}$$

transmitted from the desired angular acceleration calculation unit 43 and a dynamics parameter, and further calculates desired pressure values $P_d$ of the elastic actuators 1 at the corresponding (focused) joint, from the desired joint torque $\tau_d$ and an output of the angle estimation unit 65 thus received. The desired joint torque $\tau_d$ and the desired pressure values $P_d$ are calculated similarly to the calculation by the normal case torque control unit 45A described earlier, while replacing the corrected desired angular acceleration with the desired angular acceleration as well as replacing the joint angle q with the estimated joint angle $q_{est}$.

The abnormal case torque control unit 45B receives and uses the desired angular acceleration transmitted from the desired angular acceleration calculation unit 43. The desired angular acceleration is calculated by the desired angular acceleration calculation unit 43, from a desired value of the output of the desired trajectory generation unit 40 (as one example of the second desired output unit). The angle estimation unit 65 estimates the angle in accordance with the internal state model transmitted from the main control unit 31. The desired internal state information acquisition unit 160 is therefore configured by the angle estimation unit (the output estimation unit) 65 and the abnormal case torque control unit 45B.

As described above, differently from the abnormal case operation control unit 33 of the first embodiment adopting the internal state model of receiving the joint angle and outputting the pressure difference so as to utilize as the desired internal state determination unit 60, in the abnormal case operation control unit 33 in the control apparatus 30 of the second embodiment, the internal state model of receiving the pressure difference and outputting the joint angle is adopted so as to utilize as the angle estimation unit 65. Further, the control apparatus 30 includes the main control unit 31, the normal case operation control unit 32, and the abnormal case operation control unit 33. Moreover, the normal case operation control unit 32 is provided with the abnormality determination unit 49. In the above configuration, the abnormality determination unit 49 determines whether or not the encoders 8 are normal. When the abnormality determination unit 49 determines that any one of the encoders 8 is not normal, the main control unit 31 switches from the normal case operation control unit 32 to the abnormal case operation control unit 33. Furthermore, the abnormal case operation control unit 33 is provided with the angle estimation unit 65. As a result, even if any one of the encoders 8 is in trouble, the elastic actuator drive mechanism 10 is controlled not to stop immediately but to be operable continuously and safely.

Though the present invention has been described above based on the above first to second embodiments, the present invention should not be limited to the above-described first to second embodiments. For example, the present invention also includes the following cases.

Each of the above-described apparatuses is actually a computer system that includes, for example, a microprocessor, ROM, RAM, hard disk unit, display unit, keyboard, and mouse. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

In other words, in each of the above-mentioned embodiments, each component may be composed of dedicated hardware, or implemented by executing programs for components feasible with software. Each component can be implemented as a result that a program executing part such as a CPU reads and executes software programs recorded in a recording medium such as a hard disk or semiconductor memory. Here, software that implements an information-processing device according to each of the above-mentioned embodiments is a following program. That is to say, this program has a computer execute the units/steps defined in claims. The program has a computer execute the units/steps defined in claims. That is, such a program is a control program for an elastic actuator drive mechanism, the program causing a computer to execute functions of:

determining, by an abnormality determination unit, whether or not an output measurement unit that measures an output of an elastic actuator is abnormal;

controlling, by a normal case operation control unit, the elastic actuator drive mechanism in accordance with an output of the output measurement unit, when the abnormality determination unit determines that the output measurement unit is normal;

controlling, by an abnormal case operation control unit, the elastic actuator drive mechanism in accordance with an internal state model, when the abnormality determination unit determines that the output measurement unit is abnormal;

operating, by a control unit, the normal case operation control unit when the abnormality determination unit determines that the output measurement unit is normal, or switching from the normal case operation control unit to the abnormal case operation control unit to operate the abnormal case operation control unit by the control unit, when the abnormality determination unit determines that the output measurement unit is abnormal;

when the normal case operation control unit is operated,
outputting, from a first desired output unit, a desired value of the output of the elastic actuator, and
calculating, by a torque control unit, a desired joint torque in accordance with an output of the first desired output unit and the output of the output measurement unit, to control the elastic actuator drive mechanism in accordance with the desired joint torque calculated by the torque control unit; and when the abnormal case operation control unit is operated,
outputting, from a second desired output unit, a desired value of the output of the elastic actuator, and
acquiring, by a desired internal state information acquisition unit, desired internal state information on the elastic actuator in accordance with the desired value of the output of the second desired output unit and the internal state model, to control the elastic actuator drive mechanism not in accordance with a measurement result of the output of the elastic actuator but in accordance with the desired internal state information acquired by the desired internal state information acquisition unit so that the elastic actuator is operated continuously.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiment(s) or modification(s) can be produced.

Industrial Applicability

The control apparatus, the control method, and the control program for the elastic actuator drive mechanism according to the present invention are useful as a control apparatus, a control method, and a control program for positional control, such as control on a positional track of an arm tip of a robot arm that is operated by an elastic actuator. Application of the present invention is not limited to such a robot arm, but the present invention is also applicable as a control apparatus, a control method, and a control program for a rotation mechanism configured by an elastic actuator in a production facility, or as a control apparatus, a control method, and a control program for a linear motion mechanism configured by an elastic actuator, such as a linear slider or a presser.

Although the present invention has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A control apparatus of an elastic actuator drive mechanism, comprising:
   an abnormality determination unit that determines whether or not an output measurement unit that measures an output of an elastic actuator is abnormal;
   a normal case operation control unit that controls the elastic actuator drive mechanism in accordance with an output of the output measurement unit when the abnormality determination unit determines that the output measurement unit is normal;
   an abnormal case operation control unit that controls the elastic actuator drive mechanism in accordance with an internal state model when the abnormality determination unit determines that the output measurement unit is abnormal; and
   a control unit that operates the normal case operation control unit when the abnormality determination unit determines that the output measurement unit is normal, and that switches from the normal case operation control unit to the abnormal case operation control unit so as to operate the abnormal case operation control unit when the abnormality determination unit determines that the output measurement unit is abnormal; wherein
   the normal case operation control unit comprises:
   a first desired output unit that outputs a desired value of the output of the elastic actuator; and
   a torque control unit that calculates a desired joint torque in accordance with an output of the first desired output unit and the output of the output measurement unit,
   the normal case operation control unit controls the elastic actuator drive mechanism in accordance with the desired joint torque calculated by the torque control unit,
   the abnormal case operation control unit comprises:
   a second desired output unit that outputs a desired value of the output of the elastic actuator; and
   a desired internal state information acquisition unit that acquires desired internal state information on the elastic actuator in accordance with a desired value of the output of the second desired output unit and the internal state model, and
   the abnormal case operation control unit controls the elastic actuator drive mechanism not in accordance with a measurement result of the output of the elastic actuator but in accordance with the desired internal state information acquired by the desired internal state information acquisition unit so that the elastic actuator is operated continuously.

2. The control apparatus according to claim 1, wherein the desired internal state information acquisition unit of the abnormal case operation control unit comprises a first desired internal state calculation unit that calculates desired internal state information in accordance with the desired value of the output of the second desired output unit and the internal state model, and the elastic actuator drive mechanism is controlled in accordance with the desired internal state information calculated by the first desired internal state calculation unit so that the elastic actuator is operated continuously.

3. The control apparatus according to claim 1, wherein the desired internal state information acquisition unit of the abnormal case operation control unit comprises:
   an output estimation unit that estimates the output of the elastic actuator in accordance with the internal state model and the internal state information on the elastic actuator; and
   a second desired internal state information calculation unit that calculates desired internal state information in accordance with the output of the elastic actuator estimated by the output estimation unit and the desired value of the output of the second desired output unit; and
   the elastic actuator drive mechanism is controlled in accordance with the desired internal state information calculated in accordance with the output of the elastic actuator estimated by the output estimation unit, so that the elastic actuator is operated continuously.

4. The control apparatus according to claim 1, wherein the abnormality determination unit compares information on a relationship between the output of the output measurement unit and an internal state from an internal state measurement unit that measures an internal state of the elastic actuator, with information on a relationship between the output of the elastic actuator and the internal state of the elastic actuator in an internal state model for the output measurement unit being normal, to determine whether or not the output measurement unit is abnormal.

5. The control apparatus of an elastic actuator drive mechanism according to claim 1, wherein the second desired output unit in the abnormal case operation control unit and the first desired output unit in the normal case operation control unit output desired values of different outputs of the elastic actuator, respectively, to control by the abnormal case operation control unit, when the abnormal case operation control unit is operated, such that the elastic actuator moves to a safety position and then stops.

6. The control apparatus of an elastic actuator drive mechanism according to claim 1, wherein the elastic actuator is a fluid pressure actuator.

7. A method of controlling an elastic actuator drive mechanism, the method comprising:
   determining, by an abnormality determination unit, whether or not an output measurement unit that measures an output of an elastic actuator is abnormal;
   controlling, by a normal case operation control unit, the elastic actuator drive mechanism in accordance with an output of the output measurement unit, when the abnormality determination unit determines that the output measurement unit is normal, or
   controlling, by an abnormal case operation control unit, the elastic actuator drive mechanism in accordance with an internal state model, when the abnormality determination unit determines that the output measurement unit is abnormal;
   operating, by a control unit, the normal case operation control unit when the abnormality determination unit determines that the output measurement unit is normal, or switching from the normal case operation control unit to the abnormal case operation control unit to operate the abnormal case operation control unit by the control unit, when the abnormality determination unit determines that the output measurement unit is abnormal;
   when the normal case operation control unit is operated,
   outputting, from a first desired output unit, a desired value of the output of the elastic actuator, and
   calculating, by a torque control unit, a desired joint torque in accordance with an output of the first desired output unit and the output of the output measurement unit, to control the elastic actuator drive mechanism in accordance with the desired joint torque calculated by the torque control unit; and when the abnormal case operation control unit is operated, outputting, from a second desired output unit, a desired value of the output of the elastic actuator, and acquiring, by a desired internal state information acquisition unit, desired internal state information on the elastic actuator in accordance with the desired value of the output of the second desired output unit and the internal state model, to control the elastic actuator drive mechanism not in accordance with a measurement result of the output of the elastic actuator but in accordance with the desired internal state information acquired by the desired internal state information acquisition unit so that the elastic actuator is operated continuously.

8. A control program for an elastic actuator drive mechanism, the program causing a computer to execute functions of:

determining, by an abnormality determination unit, whether or not an output measurement unit that measures an output of an elastic actuator is abnormal;

controlling, by a normal case operation control unit, the elastic actuator drive mechanism in accordance with an output of the output measurement unit, when the abnormality determination unit determines that the output measurement unit is normal;

controlling, by an abnormal case operation control unit, the elastic actuator drive mechanism in accordance with an internal state model, when the abnormality determination unit determines that the output measurement unit is abnormal;

operating, by a control unit, the normal case operation control unit when the abnormality determination unit determines that the output measurement unit is normal, or switching from the normal case operation control unit to the abnormal case operation control unit to operate the abnormal case operation control unit by the control unit, when the abnormality determination unit determines that the output measurement unit is abnormal;

when the normal case operation control unit is operated, outputting, from a first desired output unit, a desired value of the output of the elastic actuator, and calculating, by a torque control unit, a desired joint torque in accordance with an output of the first desired output unit and the output of the output measurement unit, to control the elastic actuator drive mechanism in accordance with the desired joint torque calculated by the torque control unit; and when the abnormal case operation control unit is operated, outputting, from a second desired output unit, a desired value of the output of the elastic actuator, and acquiring, by a desired internal state information acquisition unit, desired internal state information on the elastic actuator in accordance with the desired value of the output of the second desired output unit and the internal state model, to control the elastic actuator drive mechanism not in accordance with a measurement result of the output of the elastic actuator but in accordance with the desired internal state information acquired by the desired internal state information acquisition unit so that the elastic actuator is operated continuously.

* * * * *